United States Patent
Norita et al.

(12)

(10) Patent No.: US 6,556,307 B1
(45) Date of Patent: Apr. 29, 2003

(54) METHOD AND APPARATUS FOR INPUTTING THREE-DIMENSIONAL DATA

(75) Inventors: Toshio Norita, Osaka (JP); Hiroshi Uchino, Kyoto (JP); Eiichi Ide, Itami (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/393,384

(22) Filed: Sep. 10, 1999

(30) Foreign Application Priority Data

Sep. 11, 1998 (JP) .......................................... 10-257869
Sep. 11, 1998 (JP) .......................................... 10-257870
Sep. 11, 1998 (JP) .......................................... 10-257871

(51) Int. Cl.$^7$ .............................................. G01B 11/24
(52) U.S. Cl. ..................... 356/608; 356/623; 702/150; 702/152; 702/159
(58) Field of Search ................................ 356/602, 608, 356/623; 702/150, 152, 153, 155, 159; 250/559.11, 559.29, 559.31, 559.32

(56) References Cited

U.S. PATENT DOCUMENTS 5,668,631 A    9/1997  Norita et al.
6,151,118 A  * 11/2000 Norita et al. ............... 356/376
6,243,165 B1 *  6/2001 Norita et al. ............... 356/376

FOREIGN PATENT DOCUMENTS

JP           10002722         6/1998

* cited by examiner

*Primary Examiner*—Frank G. Font
*Assistant Examiner*—Michael P. Mooney
(74) *Attorney, Agent, or Firm*—McDermott, Will & Emery

(57) ABSTRACT

A method and apparatus for inputting three-dimensional data are provided, in which operation for obtaining incident angles is not required and accuracy of three-dimensional data can be improved. The method includes steps of irradiating a reference light beam from a first starting point A to an object by a first angle θA, irradiating a reference light beam from a second starting point B separated from the first starting point A to the object by a second angle θB, moving the first and the second starting points A, B in one direction so as to perform sub scanning of an imaginary plane VS, detecting time points TA, TB when the reference light beam reflected by the object Q passes each sampling section of the imaginary plane; and calculating the position of the object for each sampling section in accordance with positions of the first and second starting points A, B in each of the detected time points TA, TB and first and second angles θA, θB.

60 Claims, 42 Drawing Sheets

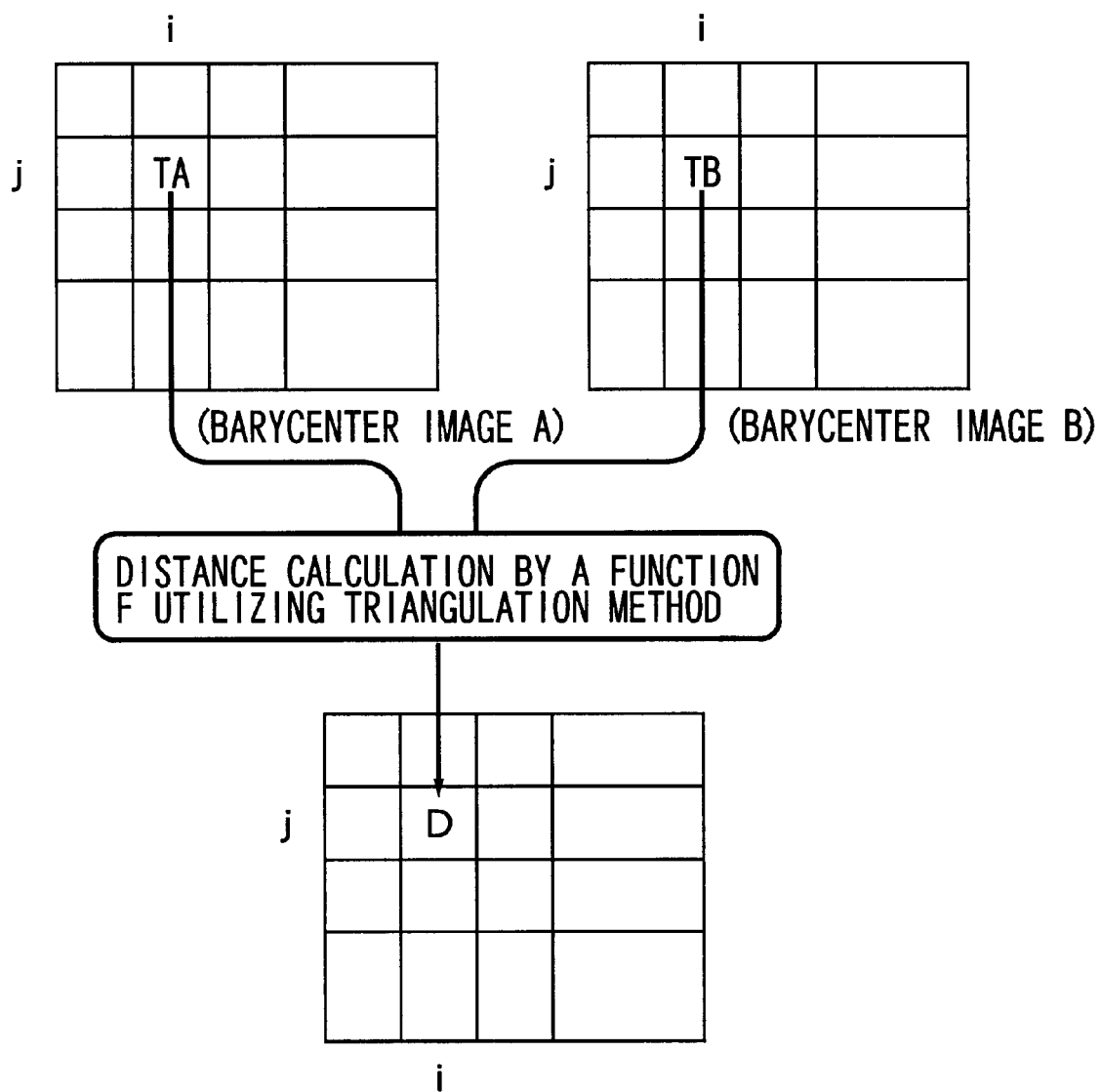

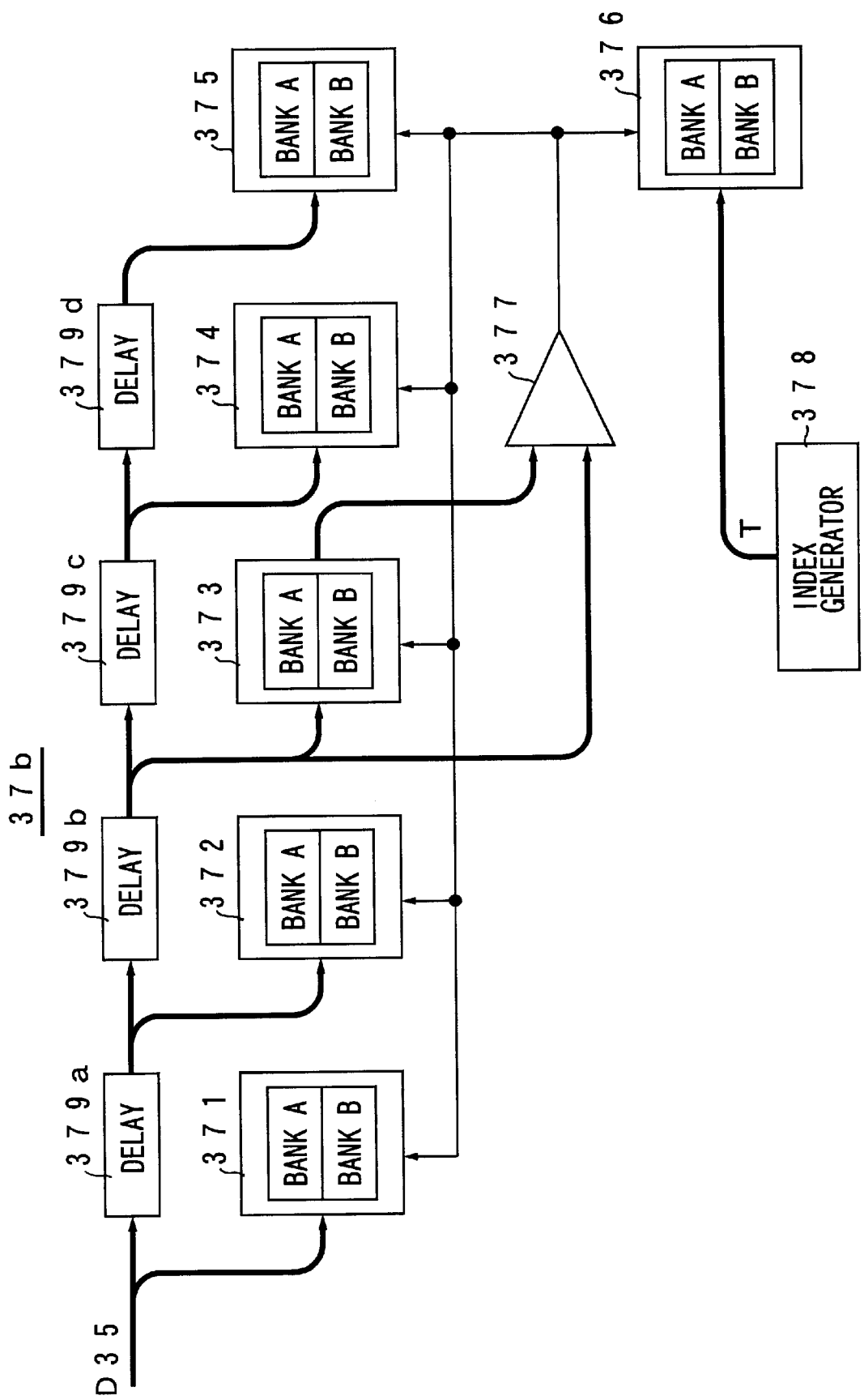

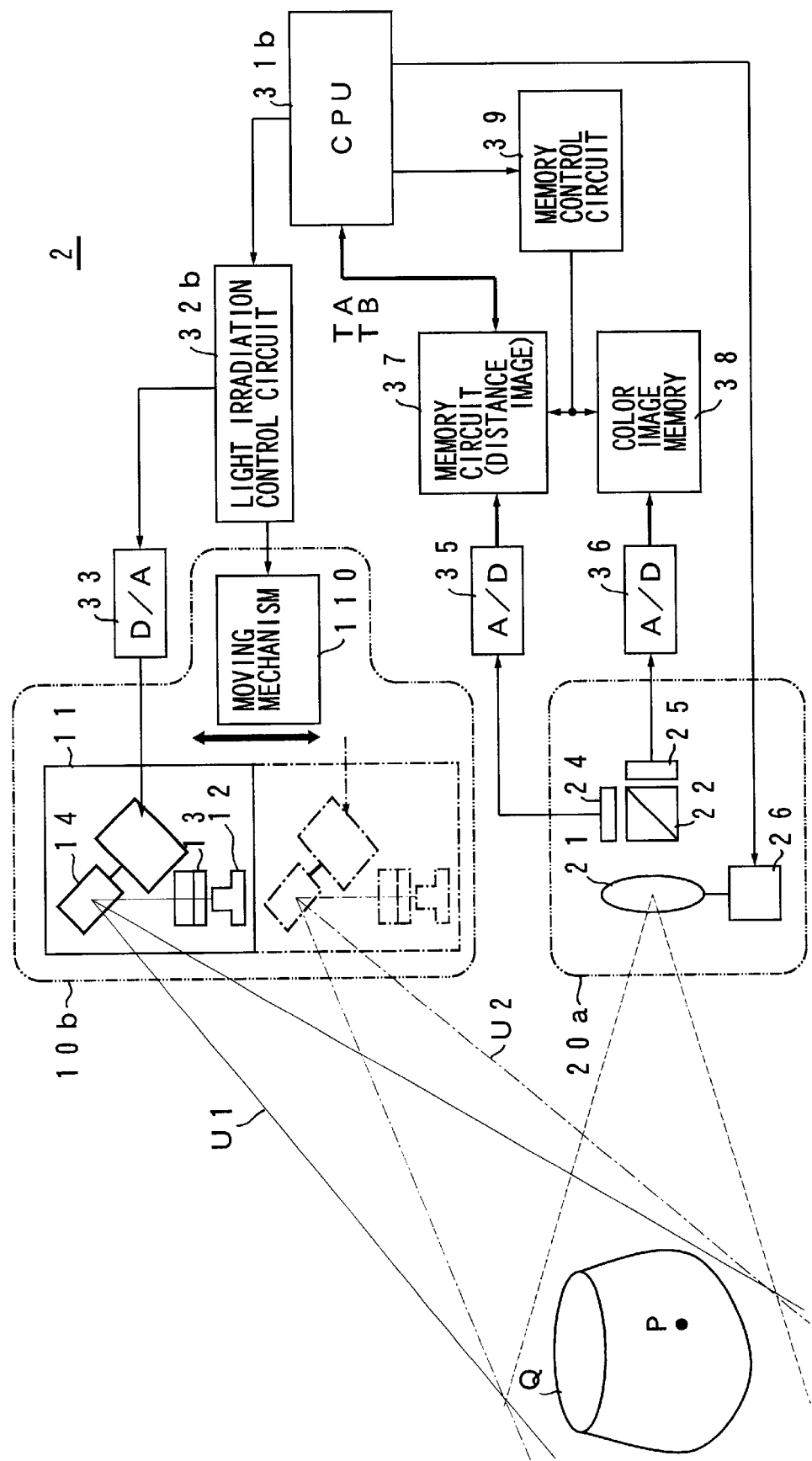

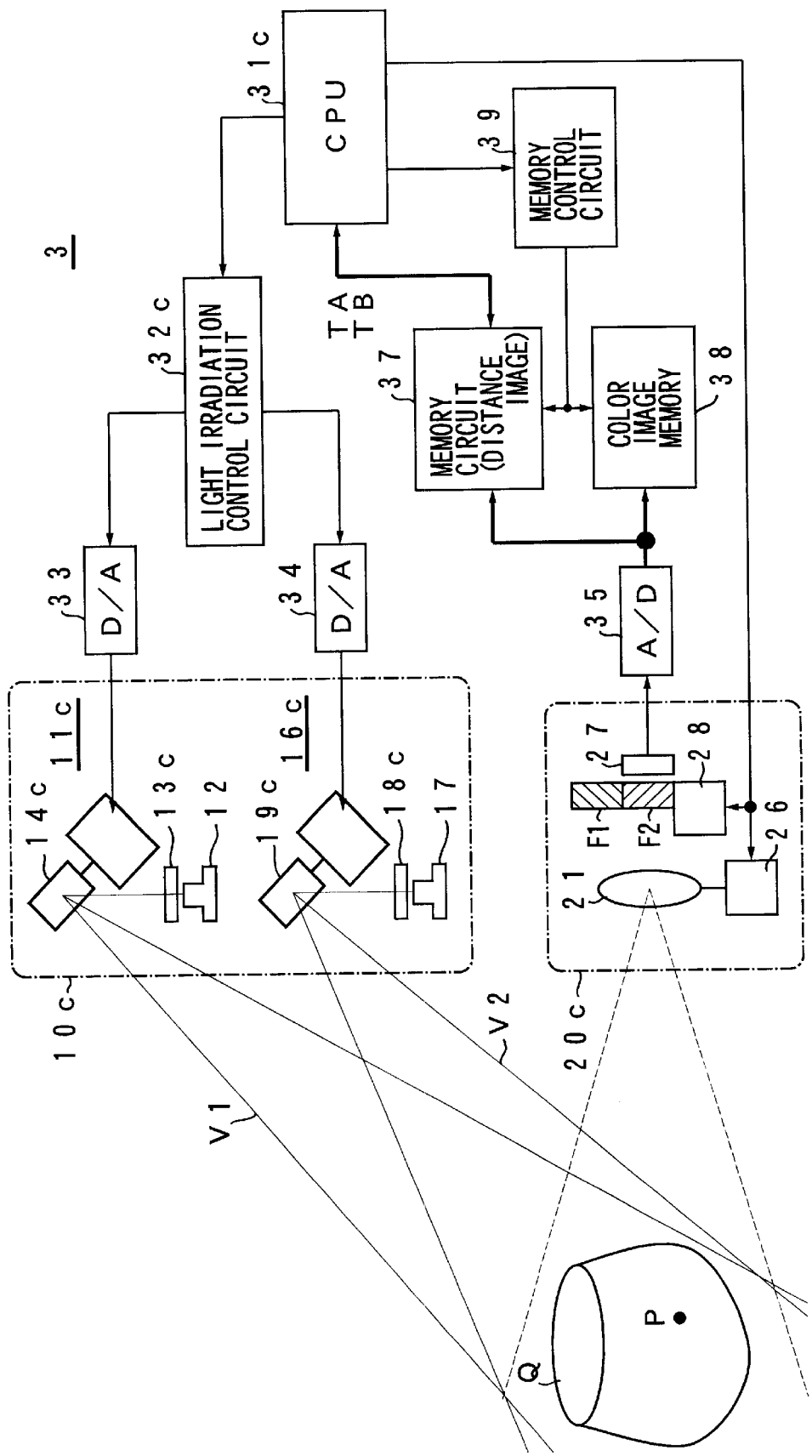

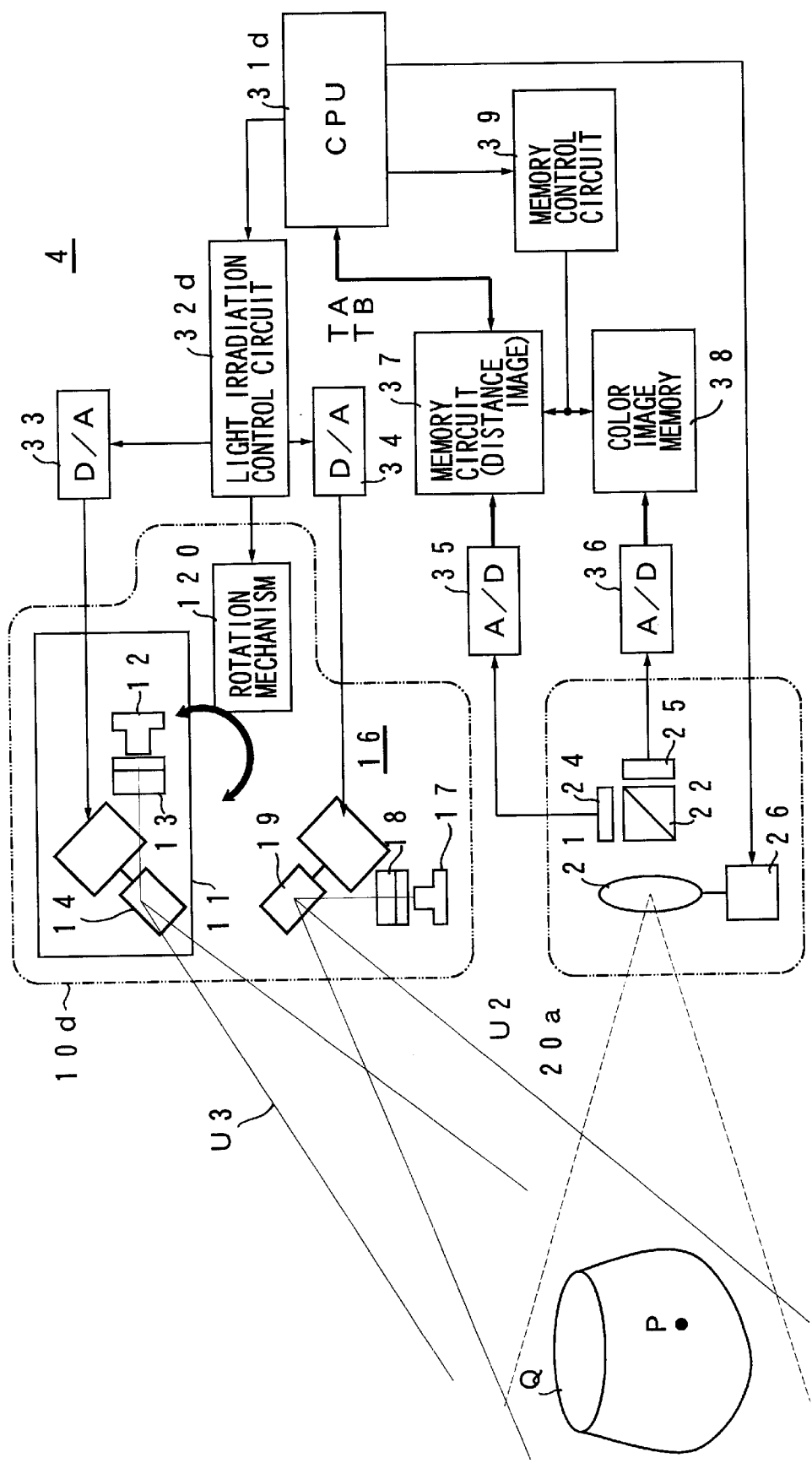

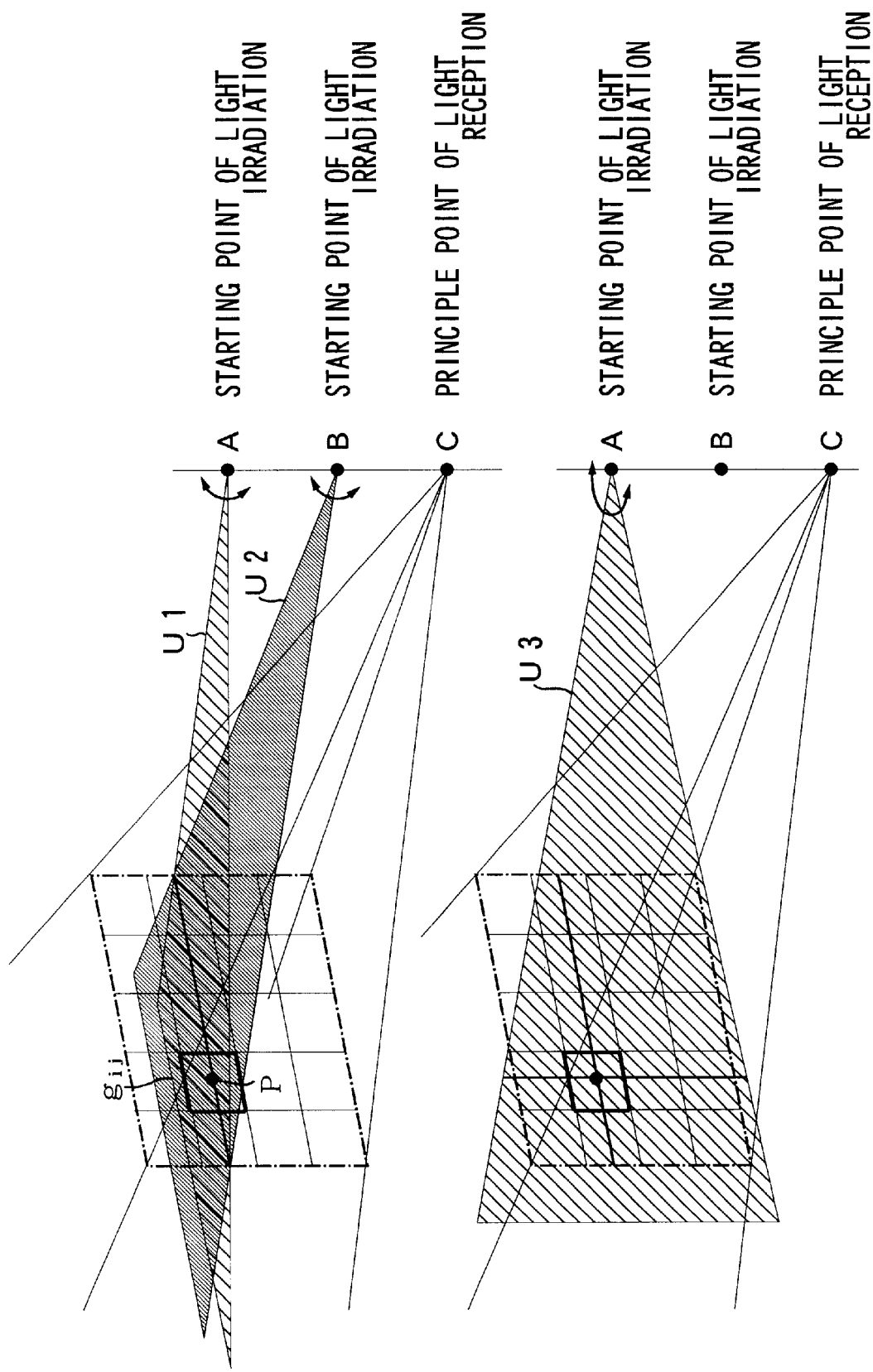

Fig. 20
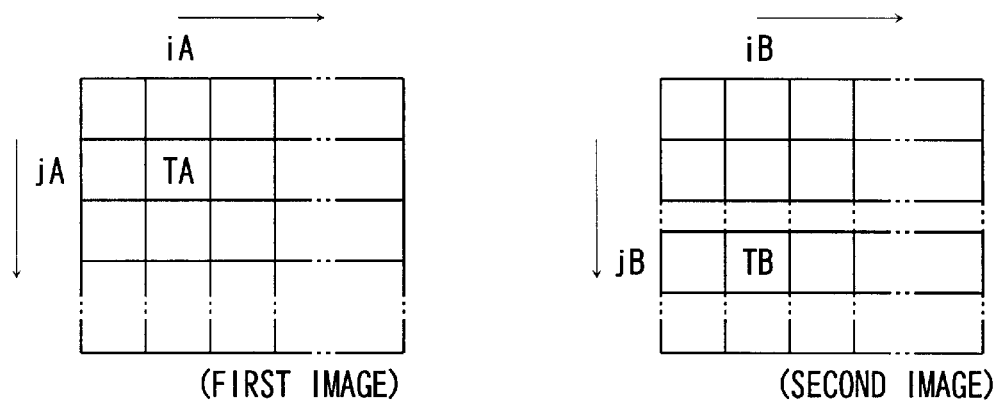
(FIRST IMAGE)     (SECOND IMAGE)
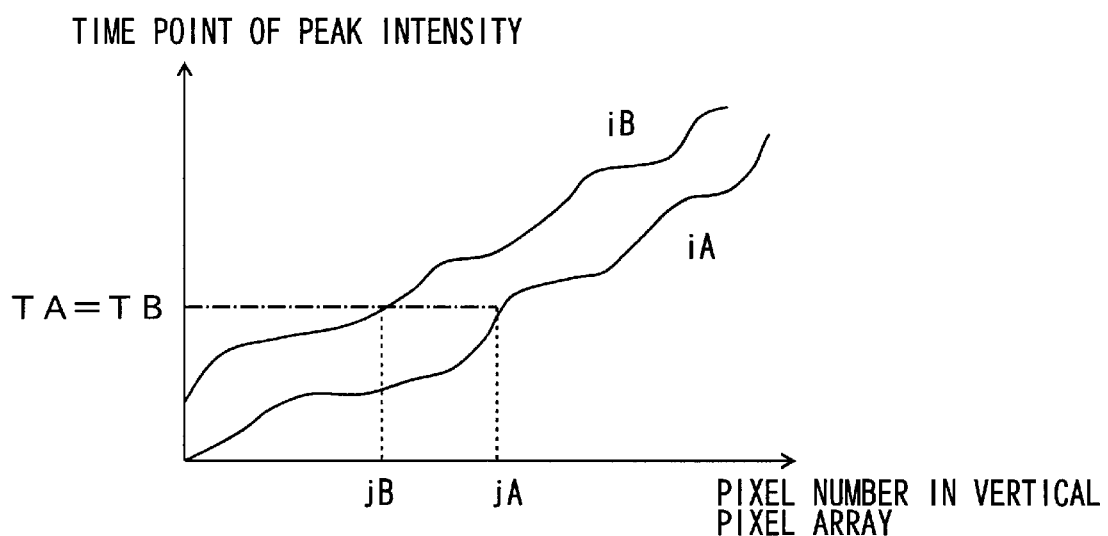

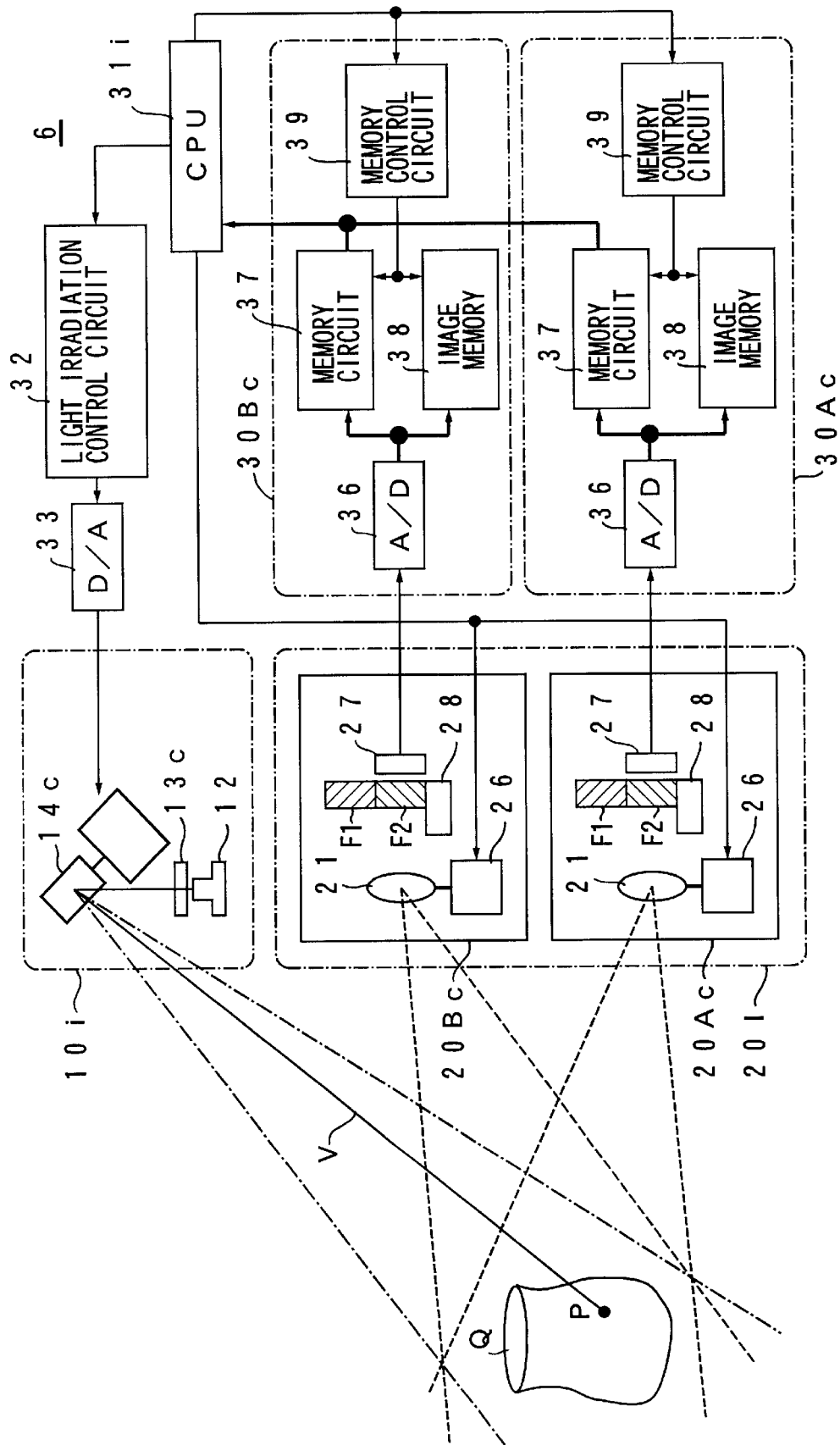

$\theta A < 90°$
$\theta B > 90°$ $\theta A < 90°$
$\theta A + \theta B = 180°$ $\theta A < 90°$ $\theta B = 90°$

METHOD AND APPARATUS FOR INPUTTING THREE-DIMENSIONAL DATA

This application is based on Japanese Patent Application No. 10-257869/1998 filed on Sep. 11, 1999, No. 10-257870/1998 filed on Sep. 11, 1999, and No. 10-257871/1998 filed on Sep. 11, 1999, the contents of which are incorporated herein by reference.

BACKGROUND OF THE INVENTION

1. Field of the Invention

The present invention relates to a method and an apparatus for inputting three-dimensional data that determines the shape of an object by irradiating a reference light beam toward the object so as to scan the object.

2. Description of the Prior Art

An apparatus for inputting three-dimensional data, which is a non-contact type and enables rapid measurement compared with a contact type, is used for data input into a CG system or a CAD system, physical measurement, visual sense of a robot or other applications.

A slit light projection method (also referred to as light cutting method) is known as a measurement method suitable for the three dimensional configuration measuring apparatus. By this method a distance image (three-dimensional image) can be obtained by scanning an object optically. The method is one of active measurement methods for taking an image of an object by irradiating a specific reference light beam. The distance image is a set of pixels that indicate three-dimensional positions of plural parts of the object. In the slit light projection method, a slit light beam having a slit-like section of the irradiated. light beam is used as the reference light beam. At a certain time point in the scanning, a part of the object is irradiated and an emission line that is curved corresponding to ups and downs of the irradiated part appears on the image sensing surface. Therefore, a group of three-dimensional data that determine the shape of the object can be obtained by periodically sampling intensity of each pixel of the image sensing surface in the scanning.

In the conventional method, the position of the object is calculated by triangulation from incident angle of the slit light beam reflected by the object and entering the image sensing surface, irradiation angle of the slit light beam, and length of the base line (distance between a starting point of the irradiation and a light receiving reference point), after determining the incident angle of the slit light beam in accordance with the position of the emission line in the image sensing surface. Namely, the position is calculated in accordance with the irradiation direction and the receiving direction of the reference light beam. The position of the object is calculated from the irradiation direction and the receiving direction also in the case where a spot light whose beam section is like spot is used as shown in Japanese Unexamined Patent Application No. 10-2722.

The three dimensional measuring apparatus can realize zooming for adjusting angle of view in taking picture. Another method is known in which one sampling is limited not to an entire image sensing surface but to a part region where the reference light beam will enter, and the region is shifted for every sampling. According to this method, time period necessary for one sampling can be shortened and the scanning speed can be increased. Thus, data quantity can be reduced and the load on a signal processing system can be reduced.

In the conventional method, accuracy of three-dimensional input data depends on accuracy of incident angle of the reference light beam that is determined in accordance with the image information. Therefore, it is difficult to get three-dimensional input data with sufficiently high accuracy. In addition, a complicated operation is required to ensure the sufficient accuracy. Fore example, when using a mirror to take image of an object indirectly, the accuracy of the incident angle is lowered compared with direct capture of image, due to influences of accuracy of the mirror surface and the attachment position thereof. In the case where zooming function or focusing function is added, slightly different correction of lens distortion should be performed for each stop position of the movable lens. In some cases, a process is necessary in which the zoom step is switched for setting adjustment contents or the adjustment contents of other zoom steps are speculated in accordance with the measurement result.

Another problem is that expensive components have to be used for ensuring sufficient accuracy. Still another problem is that the adjustment of the attachment position of the irradiation system requires much effort. It is difficult to ensure the accuracy because the irradiation system includes a moving mechanism for deflecting the reference light beam, and the operation of the moving mechanism can be easily affected by change in environmental condition such as temperature or humidity.

In a three-dimensional distance measuring apparatus that irradiates a patterned light beam, orientations of the object position viewed from plural view points are determined by matching of characteristics of plural images that are "epipola" restricted, and the object position is calculated in accordance with the orientations using the triangulation method. In this method for inputting three-dimensional data, accuracy of the three-dimensional input data depends on accuracy of the matching though it does not depend on accuracy of projection of the pattern light. Variation of sensitiveness of pixels of a light receiving device also affects the matching.

SUMMARY OF THE INVENTION

The object of the present invention is to provide a method and an apparatus in which input of three-dimensional data is realized not depending on incident angle information of the reference light beam, so that the operation for getting the incident angle information is not required, and accuracy of the three-dimensional data is improved when accuracy of the incident angle information is low compared with the irradiation angle information. Another object of the present invention is to provide a method and an apparatus in which three-dimensional input data with high accuracy can be obtained not depending on accuracy of irradiation angle control.

A first aspect according to the present invention comprises the steps of irradiating a first reference light beam form a first starting point to a specific part of an object; irradiating a second reference light beam from a second starting point at a distance from the first starting point to the specific part; and calculating the position of the specific part in accordance with irradiation angles of the first and the second reference light beams, and in accordance with a distance between the first and the second starting points. Preferably, each of the first and the second reference light beams may have a slit-like section. The irradiation angle of the slit-like reference light beam may be changed to scan in the direction perpendicular to the longitudinal direction of the slit-like section. The slit-like reference light beam preferably scans in the longitudinal direction of the slit-like section.

The position of the specific part may include information of the position in the direction perpendicular to the depth direction of the object. The scanning can be performed by changing the irradiation angles of the first and the second reference light beams. Each of the first and the second reference light beams may have a spot-like section.

A second aspect according to the present invention comprises the steps of irradiating a reference light beam toward an imaginary plane so as to scan the imaginary plane; receiving the reference light beam reflected by an object, at first and second receiving positions apart from each other simultaneously; detecting each time point when the reference light beam passes each sampling section of the imaginary plane after reflected by an object; and calculating the position of the object for each sampling section in accordance with light reception angles of the reference light beam of the first and the second receiving positions at each detected time point, and in accordance with a distance between the first and the second receiving positions.

A third aspect according to the present invention irradiates a reference light beam toward an object so as to scan an imaginary plane and determining positions of plural parts of the object. The apparatus may comprise a light irradiation system for irradiating the reference light beam from a first starting point to the object by a first angle, and for irradiating the reference light beam from a second starting point apart from the first starting point to the object by a second angle; a scanning mechanism for moving the first and the second starting points in one direction; an image sensing system for receiving the reference light beam reflected by the object and converting the received light into an electrical signal; and a signal processor for detecting each time point when the reference light beam reflected by the object passes each sampling section of the imaginary plane for each of the first and the second starting point, in accordance with the electrical signal. The apparatus outputs data corresponding to each of the first and the second positions at each time point detected by the signal processor, as the three-dimensional data.

Other objects and aspects of the present invention will become apparent in the following description of embodiments with reference to the accpompanying drawings.

BRIEF DESCRIPTION OF THE DRAWINGS

FIGS. 3(A) and 3(B) are diagrams for explaining how to generate the distance image data.

FIG. 5 is a block diagram of the memory circuit according to a second example.

FIG. 10 is a functional block diagram of a three-dimensional data input apparatus 2 according to a second embodiment of the present invention.

FIG. 11 is a functional block diagram of a three-dimensional data input apparatus 3 according to a third embodiment of the present invention.

FIG. 12 is a functional block diagram of a three-dimensional data input apparatus 4 according to a fourth embodiment of the present invention.

FIG. 13 is a schematic diagram of the irradiation in FIG. 12.

FIG. 20 is a diagram showing a parallax in image sensing.

FIG. 25 is a functional block diagram of a three-dimensional data input apparatus 6 according to a sixth embodiment of the present invention.

DESCRIPTION OF THE PREFERRED EMBODIMENTS

First Embodiment

Figure 1:
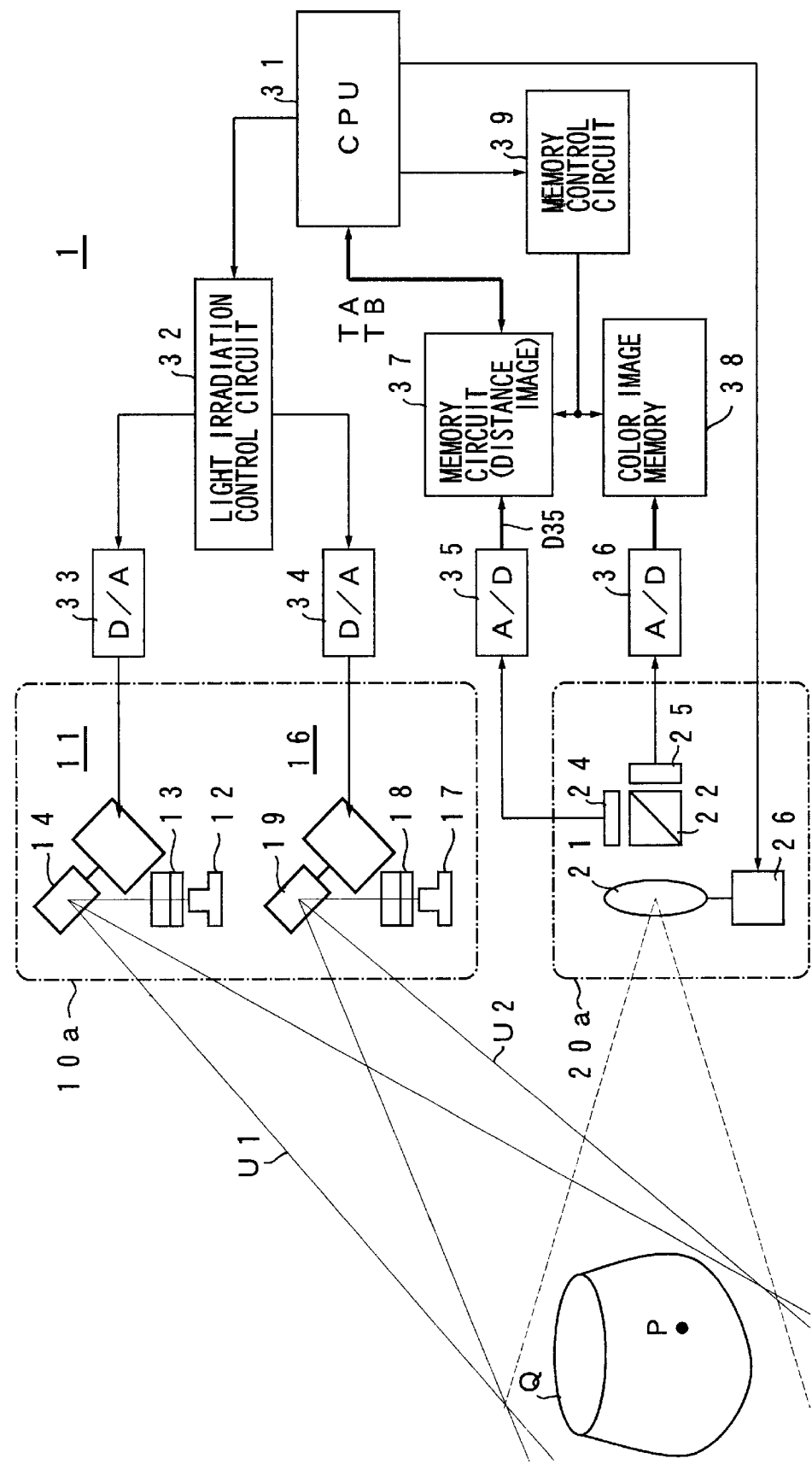
FIG. 1 is a functional block diagram of a three-dimensional data input apparatus 1 according to a first embodiment of the present invention.

FIG. 1 is a functional block diagram of a three-dimensional data input apparatus 1 according to a first embodiment of the present invention.

The three-dimensional data input apparatus 1 includes an irradiation system 10a having two light irradiation mechanisms 11, 16 and an image sensing system 20a that can perform zooming and focusing functions, and is controlled by a CPU 31.

The light irradiation mechanism 11 includes a semiconductor laser 12 as a light source, a group of lenses 13 for irradiating a slit light beam and a galvanomirror 14 as deflecting means for changing the irradiation angle. The group of lenses 13 is made up of a collimator lens and a cylindrical lens. In the same way, the light irradiation mechanism 16 includes a semiconductor laser 17, a group of lenses 18 and a galvanomirror 19. The galvanomirrors 14, 19 are given a deflection control signal by a light irradiation control circuit 32 via digital-to-analog converters 33, 34.

The image sensing system 20a includes a light receiving lens 21, a beam splitter 22, an image sensor 24 for obtaining a distance image representing a shape of an object Q, a color image sensor 25 for getting a two dimensional image for monitoring and a lens drive mechanism 26 that enables zooming and focusing functions of the lens 21. The beam splitter 22 separates light within a light emission wavelength range of the semiconductor lasers 12, 17 (e.g., the center wavelength is 670 nm) from visible light. The image sensor 24 and the color image sensor 25 are CCD area sensors. However, a CMOS area sensor can be used as the color image sensor 25. The output of the image sensor 24 is converted into received light data D35 by an analog-digital converter 35, and is sent to a memory circuit 37 in sequence. The memory circuit 37 memorizes data (TA, TB) indicating irradiation angles θA, θB explained below in accordance with the value of the received light data D35. The output of the color image sensor 25 is converted into received light data by an analog-digital converter 36 and is memorized in a color image memory 38 in sequence. Address assignment of the memory circuit 37 and the color image memory 38 is performed by a memory control circuit 39.

The CPU 31 instructs control targets properly and reads data from the memory circuit 37 to obtain distance image data by operation. The distance image data are output to an external equipment (not shown) as three-dimensional input data on proper timing. On this occasion, a two-dimensional color image that is memorized by the color image memory 38 is also output. The external equipment includes a computer, a display or a memory device.

Figure 2:
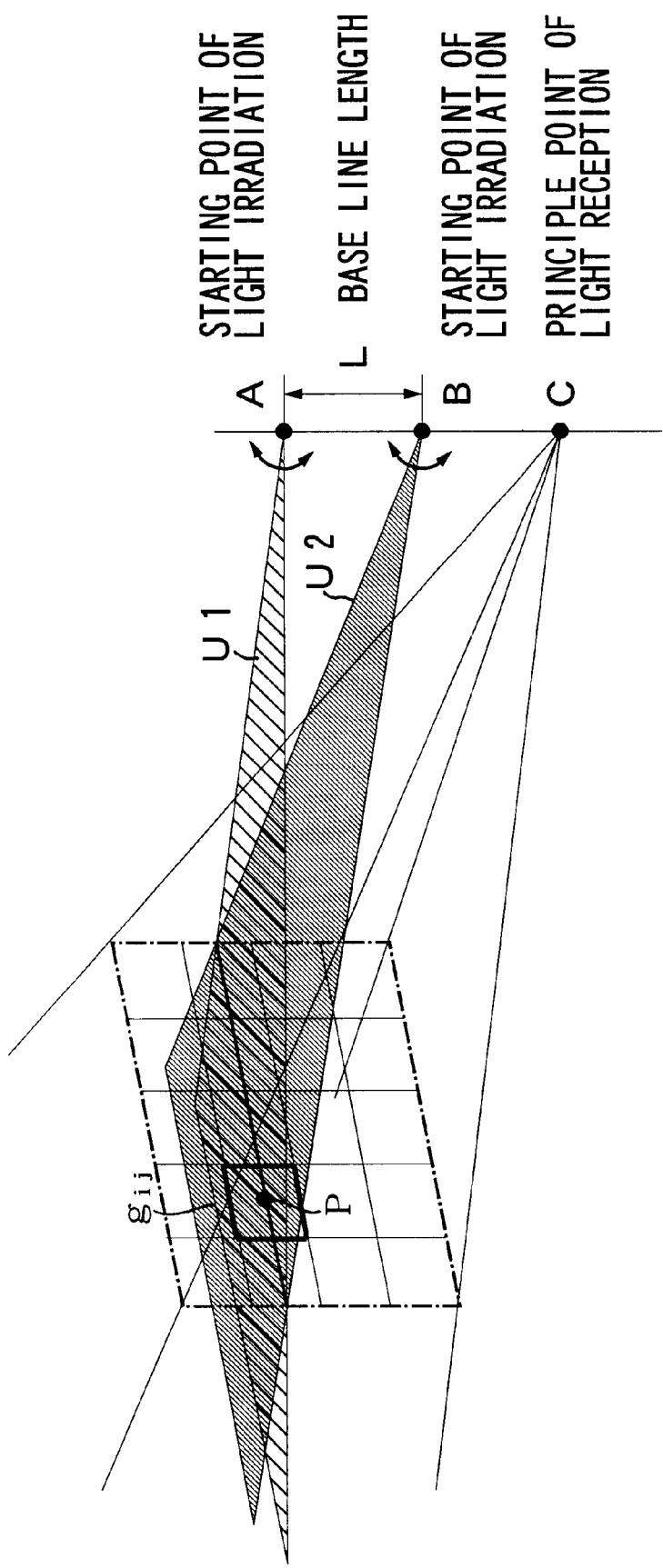
FIG. 2 is a schematic diagram of the irradiation.
Figure 3B:
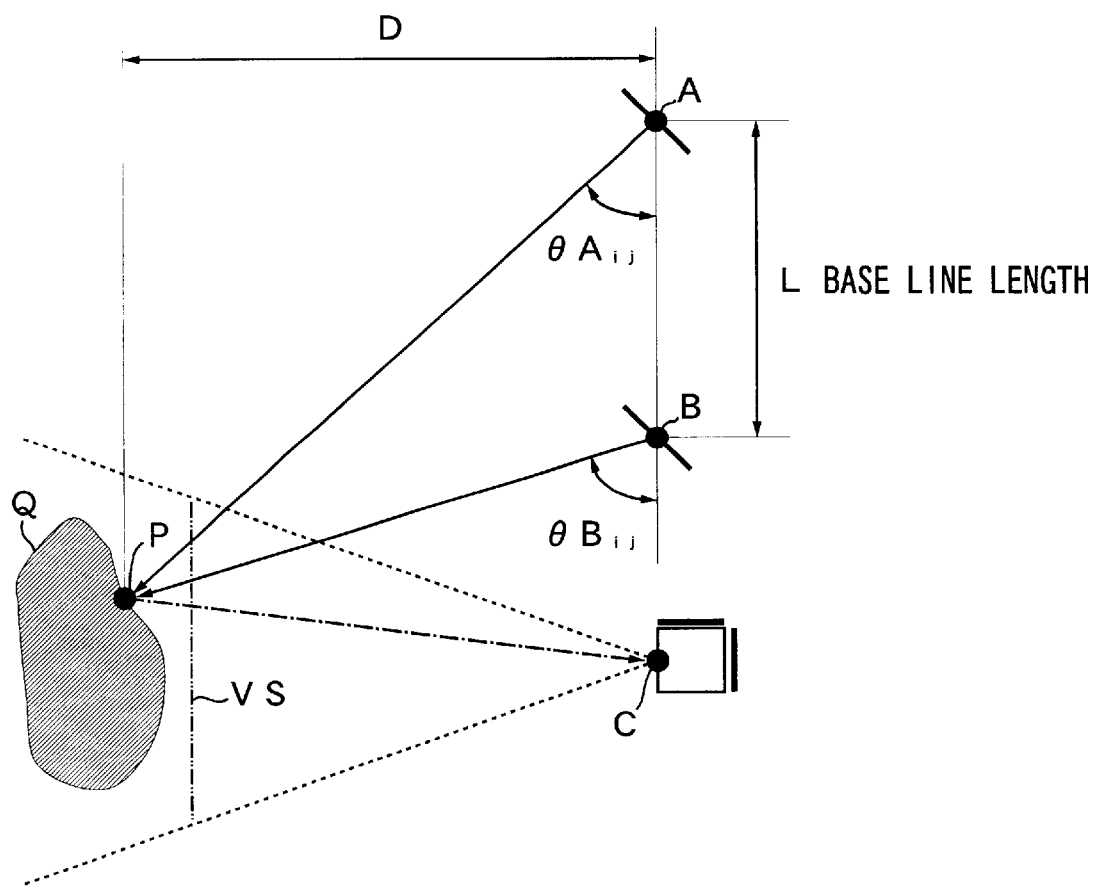

FIG. 2 is a schematic diagram of the irradiation, and FIGS. 3(A) and 3(B) are diagrams for explaining how to generate the distance image data.

The three-dimensional data input apparatus 1 irradiates the slit light beam U1 so as to scan the imaginary plane VS from a starting point A on a reflecting surface of the galvanomirror 14, and irradiates the slit light beam U2 so as to scan the imaginary plane VS from a starting point B on a reflecting surface of the galvanomirror 19. One of the two scannings by the slit light beams U1, U2 is performed first, and then the other is performed. The imaginary plane VS corresponds to a section perpendicular to the depth direction of a space (a range within the angle of view) whose image can be taken by the image sensor 24. The range corresponding to each pixel g of the image sensor 24 out of the imaginary plane VS becomes a sampling section of three-dimensional data input. In FIG. 2, the starting point A, the starting point B and a principal point C of light reception are aligned. The starting points A, B are arranged in the vertical direction, and the longitudinal direction of the slit light beams U1, U2 is regarded as the horizontal direction.

The three-dimensional data input of the object Q will be explained generally as follows.

The deflection angle of the galvanomirror 14 is controlled with synchronization with taking image by the image sensor 24 in the frame period. It is detected which timing of irradiation of the slit light beam U1 deflected in sequence each pixel of the image sensor 24 was irradiated. The object irradiated by the slit light beam U1 is imaged by the image sensor 24, and the output of the pixel $g_{ij}$ that is located on the i-th column and j-th row out of the I×J pixels g is noted. Then, the output becomes the maximum when the slit light beam U1 passes the point P corresponding to the pixel $g_{ij}$. Namely, the point P exists on the plane specified by the irradiation angle θA (as shown in FIG. 3(B)) of the slit light beam U1 at time TA when the output of the pixel $g_{ij}$ becomes the maximum and the space coordinates of the starting point A. In the same way, when irradiating from the starting point B, the point P exists on the plane specified by the irradiation angle θB of the slit light beam U2 at the time TB when the output of the pixel $g_{ij}$ becomes the maximum and the space coordinates of the starting point B. Therefore, the existence of the point P is defined on the nodal line of these two planes. Accordingly, the distance D between the base line connecting the starting points A, B and the point P in the depth direction can be calculated by applying the principle of triangulation on the basis of the irradiation angles θA, θB and the base line length L. Thus, the relative position of the starting point A, B and the point P in the vertical direction and the depth direction can be specified.

The above-explained process is performed for each pixel g, so that position data of the sampling points for the number of pixels of the object Q can be obtained. In this embodiment, the horizontal position is not defined. In some applications of the three-dimensional input data, the position in the depth direction is important, but the horizontal position is not so important. If a rough position in the horizontal direction is required, it can be calculated from the pixel position simply. In addition, by deflecting the slit light beam U1 in the horizontal direction as mentioned below, the position in the horizontal direction also can be measured accurately. Though the positions of the starting point A, B and the variation thereof depend on the configuration of the irradiation system 10, they correspond to the irradiation angle at any time point one by one. Therefore, it is enough for calculating the three-dimensional position if the irradiation angle can be detected and the starting point cannot be detected.

A concrete configuration of the circuit for detecting the time points TA, TB when the output of the pixel $g_{ij}$ becomes the maximum.

Figure 4:
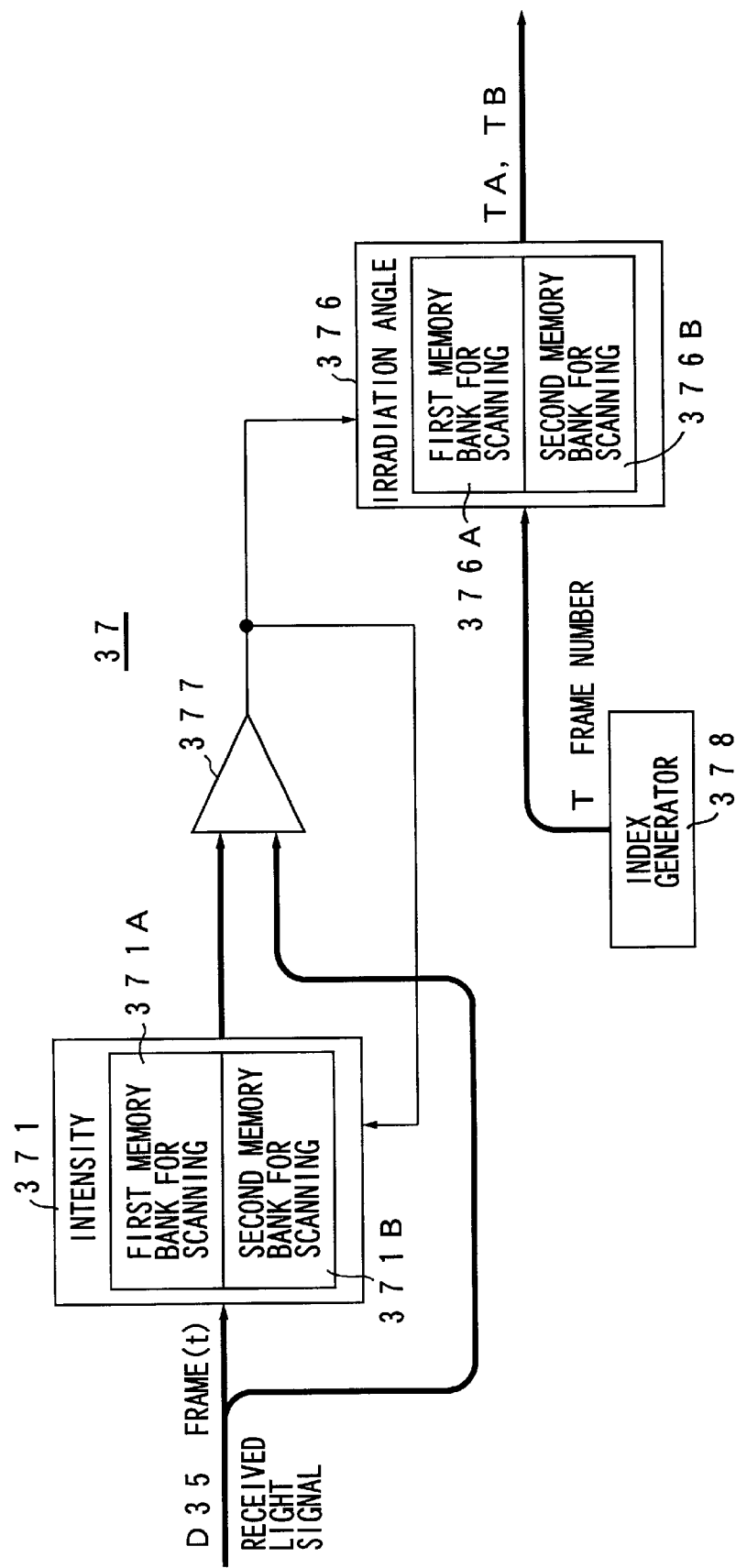
FIG. 4 is a block diagram of a first example of the memory circuit.

FIG. 4 is a block diagram of a first example of the memory circuit.

The memory circuit 37 includes two memories 371, 376, a comparator 377 and an index generator 378. The memory 371 has a memory bank 371A that is used for the first scanning by the light irradiation mechanism 11, and a memory bank 371B that is used for the second scanning by the light irradiation mechanism 16. In the same way, the memory 376 also has two memory banks 376A, 376B.

The memory 371 is given received light data D35 by the analog-digital converter 35, while the memory 376 is given a frame number T by the index generator 378. The comparator 377 compares for each pixel of the image sensor 24, the received light data D35 of the t-th frame that are the latest input data with the received light data D35 that were written into the memory 371 before, and permits writing into the memories 371, 376 if the latest received light data D35 is larger than the formerly received light data D35. Then, each of the memories 371, 376 is overwritten by the latest input data. If the result of the comparison is the opposite, each of the memories 371, 376 sustains the memorized data. Therefore, after completion of the scanning, the memory 371 memorizes the maximum value of the received light data D35 for each pixel $g_{ij}$, and the memory 376 memorizes the number T of the frame in which the received light data D35 became the maximum for each pixel $g_{ij}$. Since the image sensing of each frame is performed in a constant period, the frame number T represents the time point in the scanning period (lapse from the start of scanning). In other words, the frame number T memorized in the memory 376 corresponds to the above-mentioned time points TA, TB, which is information specifying the irradiation angles θA, θB.

According to this example, the irradiation angles θA, θB can be detected by the simple circuit. However, the resolution of detection for the irradiation angle depends on the pixel pitch of the image sensor 24. A second example that improves the resolution will be explained as the following.

Figure 6A:
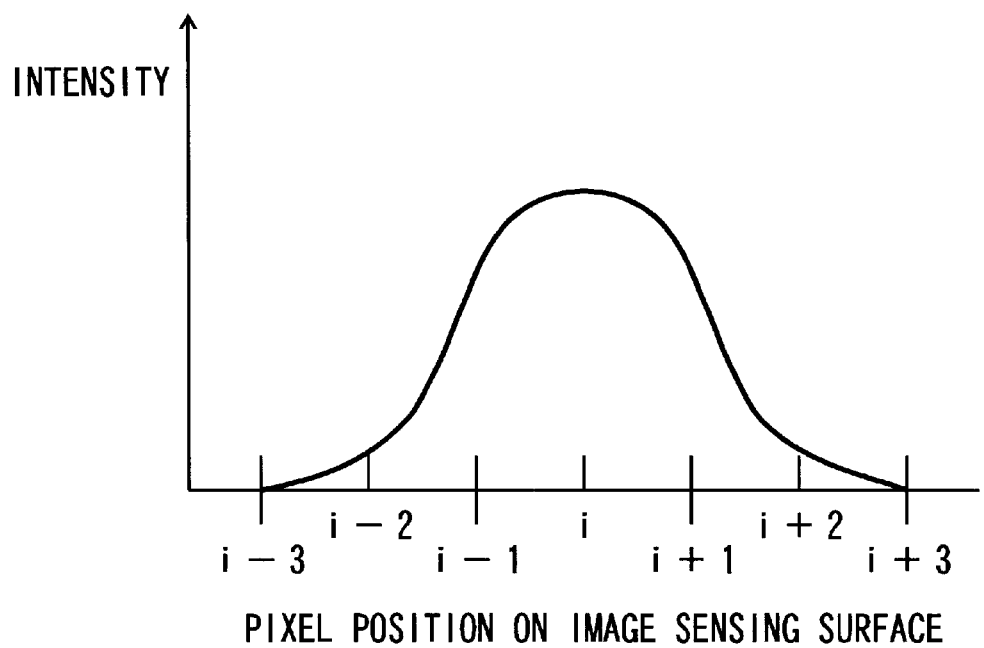
FIGS. 6(A) and 6(B) show the relationship between the distribution of intensity and the received light data on the image sensing surface.
Figure 6B:
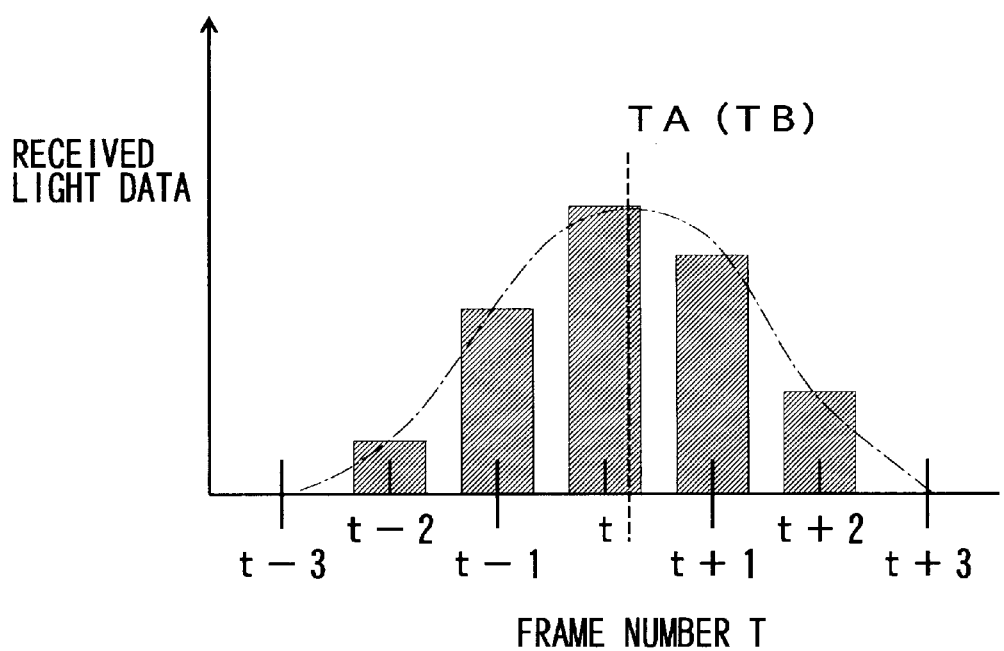

FIG. 5 is a block diagram of the memory circuit according to the second example. FIGS. 6(A) and 6(B) show the relationship between the distribution of intensity and the received light data on the image sensing surface. In FIG. 5, the element corresponding to that shown in FIG. 4 is denoted by the same numerals as in FIG. 4.

The memory circuit 37b of the second example includes four memories 372, 373, 374, 375 having the same size as the memory 371, adding to the memory 371. The four single-frame delay memories 379a–379d are used for delaying data input of each of the memories 372–375 one by one frame with respect to that of the memory 371. Namely, the memory circuit 37b memorizes five frames of the received light data D35 simultaneously that are sequential for each pixel $g_{ij}$. The comparator 377 compares the input and the output of the third memory 373 whose input is delayed by two frames. If the input data value of the memory 373 is larger than the output data value thereof (data value written before), writing into the memories 371–375 and the memory 376 is permitted.

At the end of each scanning, the memory 373 memorizes the maximum value of the received light data D35 for each pixel $g_{ij}$. In addition, the memories 371, 372, 374, 375 memorize the received light data D35 of four frames, which are two frames before the frame in which the received light data D35 became the maximum, one frame before the frame, one frame after the frame and two frames after the frame. The memory 376 memorizes the number T of the frame in which the received light data D35 became the maximum for each pixel $g_{ij}$.

As shown in FIG. 6(A), it is supposed that the width of image of the slit light beam which is imaged on the image sensing surface corresponds to 5 pixels, and the distribution of intensity is like a mountain having a single peak. In this case, one pixel $g_{ij}$ is noted to obtain the received light data which vary in accordance with the distribution of intensity as shown in FIG. 6(B). Therefore, barycenter calculation is performed in accordance with the received light data D35 of the five frames memorized in the memory 371–375, so that the time points TA, TB can be calculated in finer pitch than the frame period (i.e., the pixel pitch). In the example shown in FIG. 6(B), the time point TA (TB) is located between the t-th sampling time point and the (t+1)-th sampling time point.

The second example has an advantage in that the resolution is improved, but has a disadvantage in that a desired accuracy cannot be obtained depending on the distribution of intensity. Namely, certain noises are added to in the actual image sensing, due to characteristics of the optical system or other factors. Therefore, the distribution of intensity may have plural peaks or may have a flat without any clear peak. If the distribution of intensity gets largely out of an ideal shape, the reliability of the barycenter calculation may drop.

The influence of such noises can be reduced by performing the barycenter calculation in accordance with the distribution of intensity in a sufficiently long period rather than the short period having the frame in which the maximum value of the intensity is obtained and a few frames before and after the frame. A third example for realizing this method will be explained below.

Figure 7:
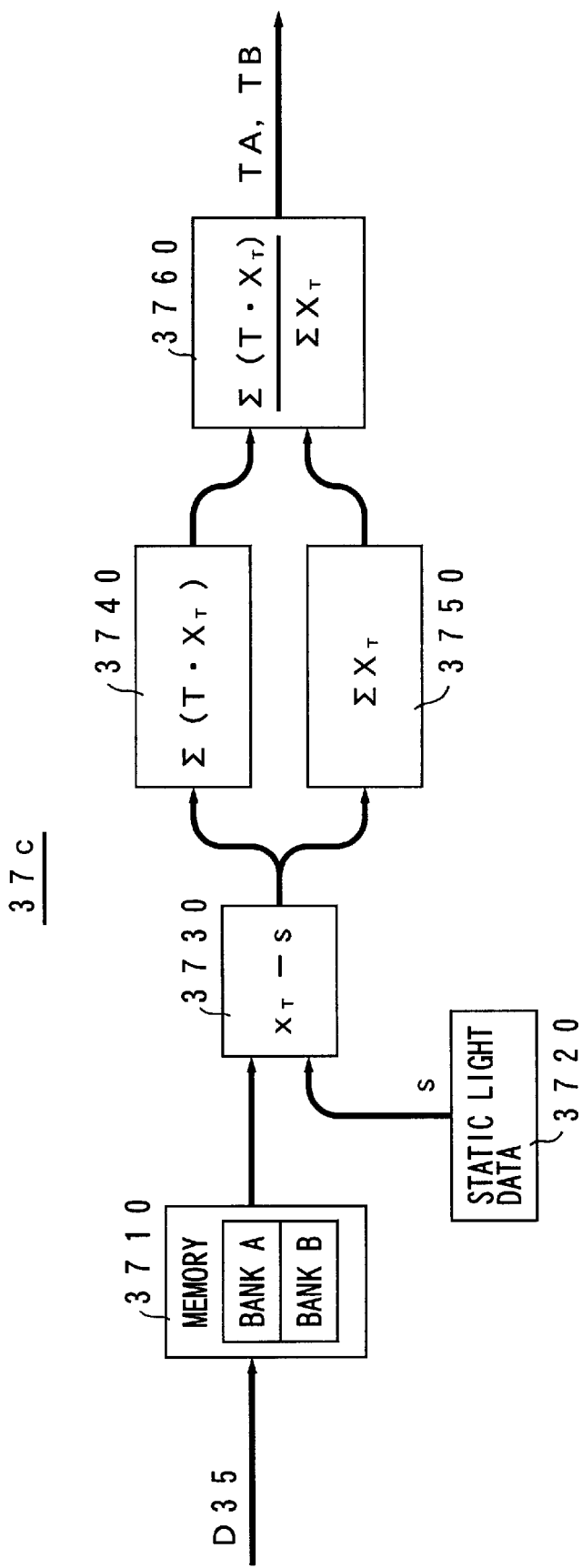
FIG. 7 is a block diagram of the memory circuit according to a third example.
Figure 8:
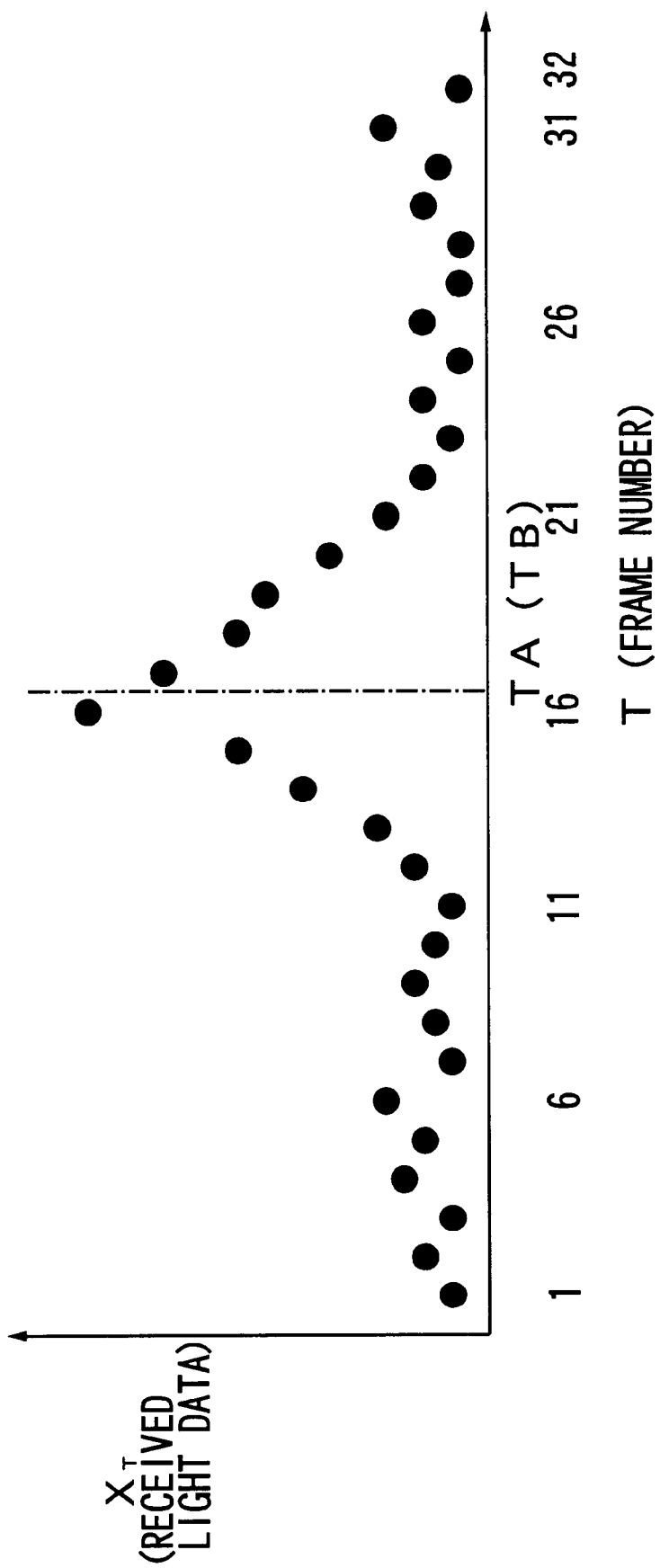
FIG. 8 is a diagram showing concept of the barycenter in accordance with FIG. 7.

FIG. 7 is a block diagram of the memory circuit according to the third example. FIG. 8 is a diagram showing concept of the barycenter in accordance with FIG. 7.

The memory circuit 37c of the third example includes a memory 3710, a static light data memory 3720, a subtractor 3730, a first adder 3740, a second adder 3750, and a divider 3760. The barycenter (time barycenter) is calculated in accordance with the received light data D35 of the plural frames for each pixel $g_{ij}$.

The memory 3710 has two banks and memorizes the received light data D35 of k frames, which were obtained by scanning performed sequentially. The received light data value of the T-th (T=1 to k) frame of each pixel $g_{ij}$ is denoted by $x_T$. The static light data memory 3720 memorizes the static light data that represent undesired incident light quantity except the slit light beams U1, U2. The static light data are calculated in accordance with the received light data D35 when the slit light beams U1, U2 do not enter. The value s may be a predetermined fixed value, or can be derived from the received light data D35 in real time. The fixed value may be five, six or ten if the received light data D35 are 8-bit data (256 gradations). The subtractor 3730 subtracts the value s of the static light data from the value $x_T$ of the received light data D35 that were read out of the memory 3710. Then, the value of the output data of the subtractor 3730 is newly assigned to $X_T$. The first adder 3740 multiplies the value of each of the k received light data D35 and the corresponding frame number T for each pixel $g_{ij}$, so as to output the sum of the multiplied results. The second adder 3750 outputs the sum of the values $X_T$ of the k received light data D35 for each pixel $g_{ij}$. The divider 3760 divides the output value of the first adder 3740 by the output value of the second adder 3750, so as to output the obtained barycenter as the time point TA (or TB).

FIGS. 9(A)–9(D) are diagrams showing an example of setting the relative position between the starting point of the light irradiation and the principal point of the light reception.

Figure 9A:
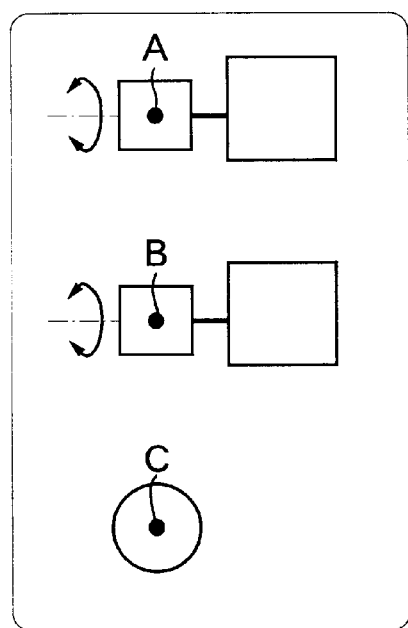
FIGS. 9(A)–9(D) are diagrams showing an example of setting the relative position between the starting point of the light irradiation and the principal point of the light reception.
Figure 9B:
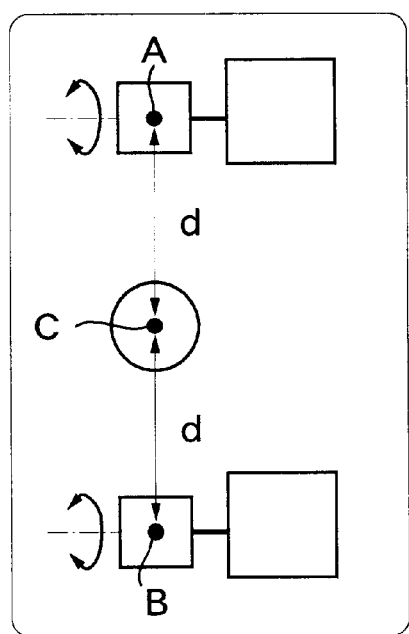
Figure 9C:
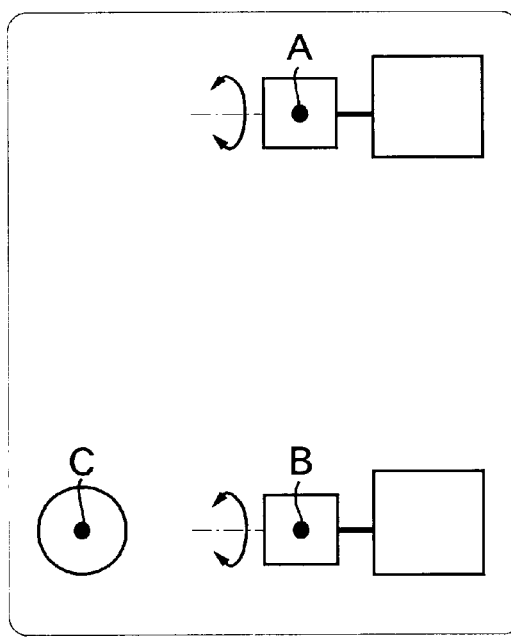
Figure 9D:
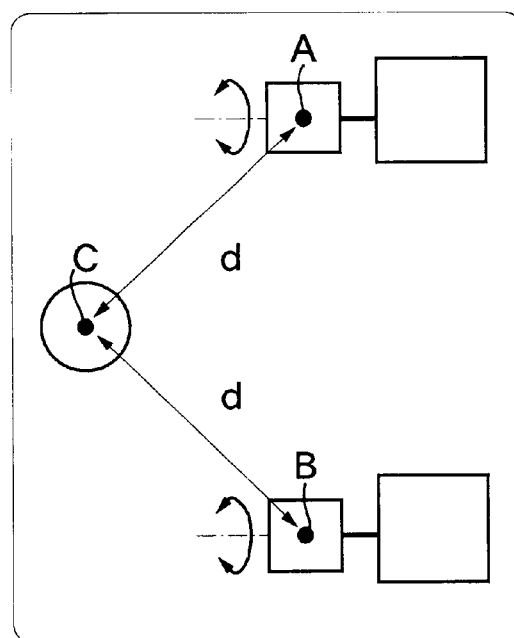

Concerning the arrangement of the irradiation system 10 and the image sensing system 20a, it is not always necessary that the starting points A, B of the light irradiation and the principal point C of the light reception are aligned as shown in FIG. 9(A) or FIG. 9(B). For example, the arrangement shown in FIG. 9(C) in which the three points are arranged in L shape or the arrangement shown in FIG. 9(D) in which the three points are arranged in T shape can be adopted. Especially, if the principal point C is disposed between the starting point A and the starting point B as shown in FIG. 9(B) or FIG. 9(D), an occlusion due to the different position of the starting points A, B can be reduced. In this case, it is desirable that the distances d between the principal point C and the starting point A is the identical to that between the principal point C and the starting point B.

Second Embodiment

FIG. 10 is a functional block diagram of a three-dimensional data input apparatus 2 according to a second embodiment of the present invention. In FIG. 10 and other following figures, the element denoted by the same numerals as in FIG. 1 has the same function as the above-mentioned three-dimensional data input apparatus 1.

The configuration of the three-dimensional data input apparatus 2 is the same as that of the three-dimensional data input apparatus 1 shown in FIG. 1 except an irradiation system 10b and the controller portion thereof. In the three-dimensional data input apparatus 2, the irradiation system 10b includes the light irradiation mechanism 11 and a moving mechanism 110 that moves the light irradiation mechanism 11 in parallel. The light irradiation mechanism 11 is moved while remaining the relative position of the semiconductor laser 12, the group of lenses 13 and the galvanomirror 14, so that the slit light beams U1, U2 can be irradiated from two separate positions as the starting points in the same way as two light irradiation mechanisms are provided. It is possible to provide a mirror that can be withdrawn in the light path, instead of moving the light irradiation mechanism 11, so that the starting point can be changed.

Third Embodiment

FIG. 11 is a functional block diagram of a three-dimensional data input apparatus 3 according to a third embodiment of the present invention.

The third embodiment uses not slit light beams but spot light beams V1, V2 having a spot-like section for image sensing by a one-dimensional image sensor (a linear sensor) 27.

The three-dimensional data input apparatus 3 includes an irradiation system 10c having two light irradiation mechanisms 11c, 16c, an image sensing system 20c that can perform zooming and focusing functions. The light irradiation mechanism 11c includes a semiconductor laser 12, a collimator lens 13c and a galvanomirror 14c. In the same way, the light irradiation mechanism 16c includes a semiconductor laser 17, a collimator lens 18c and a galvanomirror 19c.

The image sensing system 20c includes a light receiving lens 21, a lens drive mechanism 26, an infrared cut filter F1, a band-pass filter F2, a filter switching mechanism 28 and an image sensor 27 used for three-dimensional data input and monitor image sensing. The image sensor 27 is a three-line CCD sensor having pixel arrays corresponding to each of red, green and blue colors. The infrared cut filter F1 is used for monitor image sensing. The band-pass filter F2 that passes light having a wavelength within the laser wavelength band is used for three-dimensional data input, so that only the output of the red pixel array of the image sensor 27 is used as light receiving information.

When using the spot light beams V1, V2, the position of the point P on the object Q can be calculated by detecting the time points TA, TB. The explanation of the principle is omitted since it is the same as that when using the slit light beams U1, U2.

Fourth Embodiment

FIG. 12 is a functional block diagram of a three-dimensional data input apparatus 4 according to a fourth embodiment of the present invention. FIG. 13 is a schematic diagram of the irradiation in FIG. 12.

The fourth embodiment enables scanning by the slit light beam U1 in the horizontal direction, so as to specify the precise position of the point P on the object Q in the horizontal direction.

The configuration of the three-dimensional data input apparatus 4 is similar to that of the three-dimensional data input apparatus 1 shown in FIG. 1 except an irradiation system 10d and the controlling portion thereof. The irradiation system 10d of the three-dimensional data input apparatus 4 includes two light irradiation mechanisms 11, 16, and a rotation mechanism 120 for switching the deflection direction of the light irradiation mechanism 11 between the vertical and horizontal directions. The scanning in the horizontal direction is performed by rotating the light irradiation mechanism 11 by 90 degrees while keeping the relative position among the semiconductor laser 12, the group of lenses 13 and the galvanomirror 14.

In the three-dimensional data input apparatus 4, after deflecting the slit light beams U1, U2 in the vertical direction to scan for detecting the time point (time barycenter) TA, TB, the light irradiation mechanism 11 is rotated about the starting point A by 90 degrees to scan by the slit light beam U3 in the horizontal direction. In the horizontal scanning too, the time barycenter (time point) TC for the maximum output of each pixel $g_{ij}$ is calculated in the same way as in the vertical scanning. The position of point P in the horizontal direction can be calculated by applying the triangulation method in accordance with the irradiation angle in the horizontal direction that is uniquely defined by the time barycenter TC and the distance D derived from the irradiation angles θA, θB in the vertical direction as mentioned above.

Figure 14A:
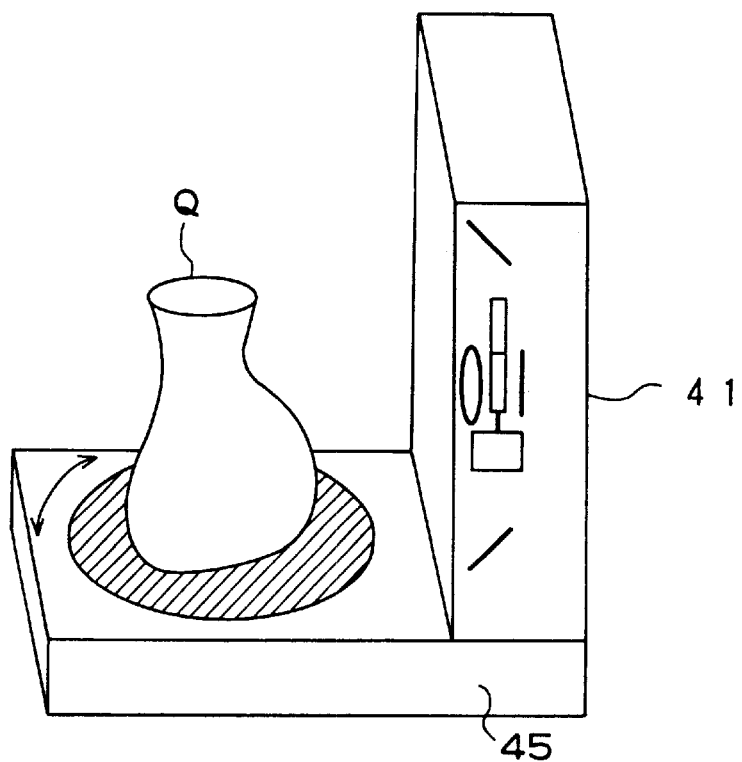
FIGS. 14(A) and 14(B) are diagrams of a configuration of the apparatus that realizes 360 degrees input and all orientation input by rotation.
Figure 14B:
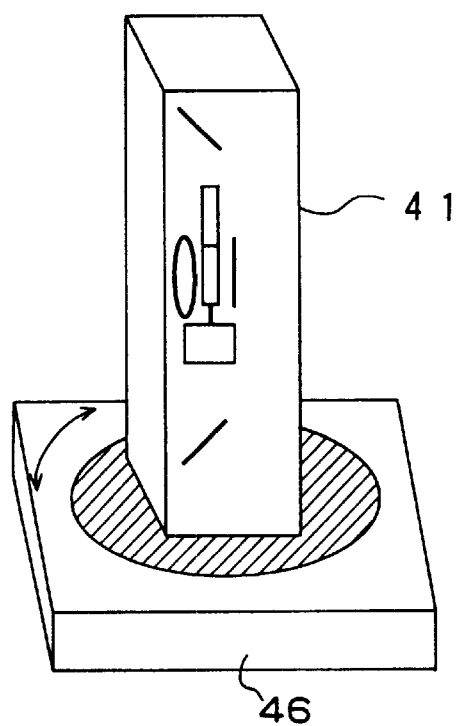
Figure 15:
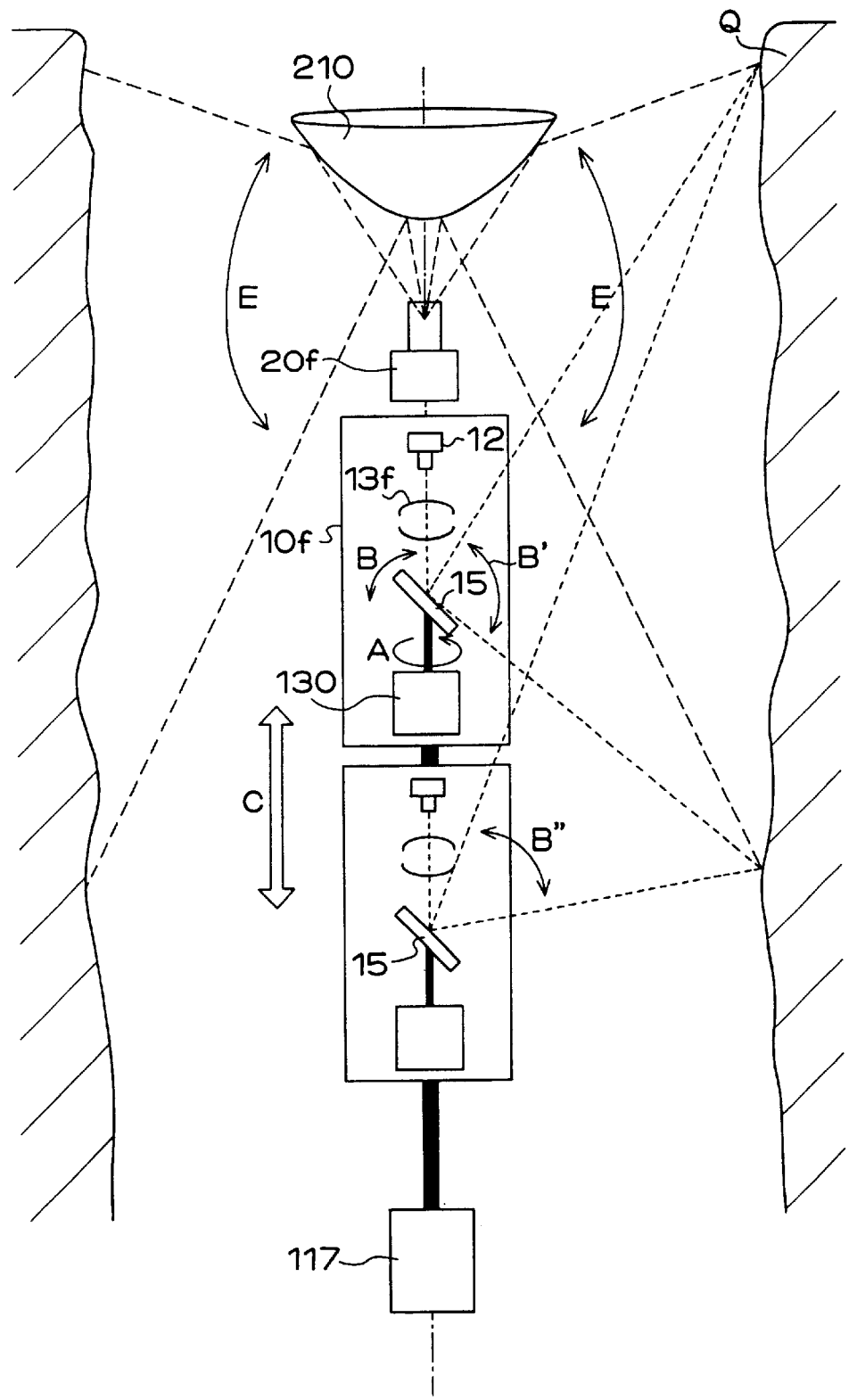
FIG. 15 is a diagram of a configuration of the apparatus that realizes all orientation input by using a mirror.
Figure 16:
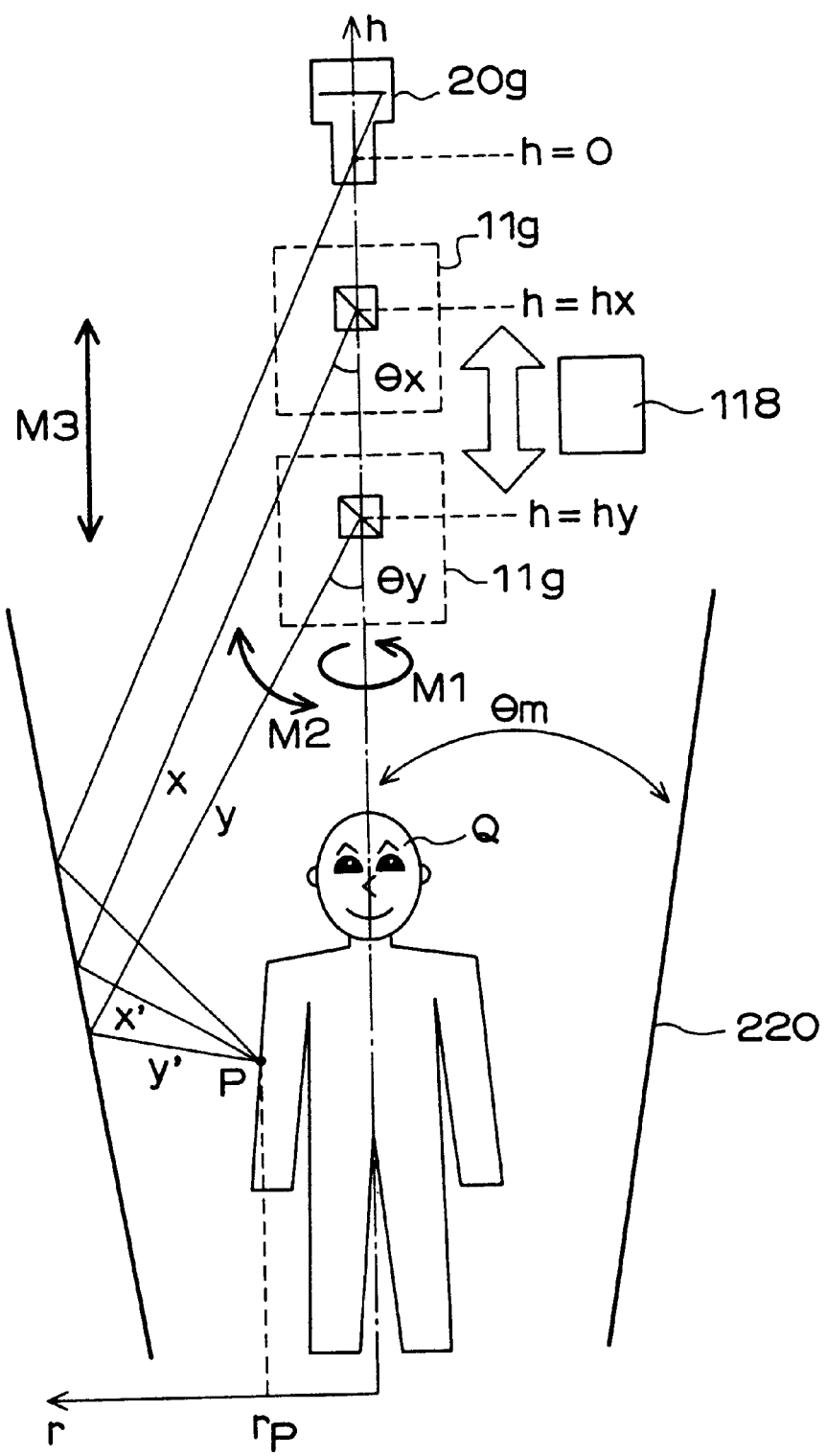
FIG. 16 is a diagram of a configuration of the apparatus that realizes 360 degrees input by using a mirror.

FIGS. 14(A) and 14(B) are diagrams of a configuration of the apparatus that realizes 360 degrees input (see FIG. 14(A)) and all orientation input (see FIG. 14(B)) by rotation. FIGS. 15 and 16 are diagrams of a configuration of the apparatus that realizes all orientation input (see FIG. 15) and 360 degrees input (see FIG. 16) by using a mirror.

The three-dimensional data input apparatus shown in FIG. 14(A) includes an optical system 41 for irradiating a light beam and image sensing, and a turntable 45 for carrying the object Q and rotating. The optical system 10e has a principal point of light reception disposed between starting points of light irradiation, and is structured to switch the filter so as to perform three-dimensional data input and color image sensing by a single image sensor. The turntable 45 rotates by predetermined angles after the object Q is scanned from a certain direction to get the barycenter. The scanning by the optical system 41 and the rotation of the turntable 45 are repeated N times, so that the three-dimensional data input is performed for the outer surface of the object Q up to 360 degrees. The optical system 41 includes a memory having a capacity for memorizing data of N times. The direction component can be determined as n×θ since it is data of n-th scanning. Thus, the three-dimensional position data in the space of the object to be measured can be obtained. Another configuration is possible in which the object Q stays and the optical system 41 turns around the object Q.

In the three-dimensional data input apparatus shown in FIG. 14(B), the optical system 41 is attached to the upper portion of the turntable 46. Using this three-dimensional data input apparatus, all orientation three-dimensional data input can be performed for the inner wall of the object having a cavity.

FIG. 15 shows a configuration of an all orientation three-dimensional measuring apparatus that utilizes a convex type curved surface mirror 210. On the axis of the curved surface mirror 210, an image sensing apparatus (e.g., a video camera) 20f is disposed in such a way that the optical axis thereof matches the mirror axis. The curved surface mirror 210 has a curved contour of the section including the axis. The curved contour is symmetric with respect to the axis and the gradient of the curve increases simply as a hyperbola. Thus, 360 degrees image around the axis within the range E shown in FIG. 15 except the range of the optical system itself including the image sensing apparatus 20f and the irradiation system is taken into the image sensing apparatus 20f.

On the axis of the curved surface mirror 210, an irradiation system 10f is disposed, which includes a light source 12, a lens 13f, a scanning mirror 15 and a mirror rotation mechanism 130. A light beam emitted from the light source 12 is collimated into a beam having a proper diameter by the lens 13f and is irradiated after reflected by the scanning mirror 15. The angle of the scanning mirror 15 can be controlled around the axis perpendicular to the axis of the curved surface mirror 210 (as shown by B in FIG. 15), so that the irradiated light beam can be deflected as shown by B' in FIG. 15. The scanning by this deflection is referred to as sub scanning. For example, a scanning mirror 15 having an angle control mechanism such as a galvanoscanner can be used for realizing the sub scanning.

The mirror rotation mechanism 130 rotates the scanning mirror 15 in the sub scanning by itself or along with at least one of the lens 13f and the light source 12 around the axis of the curved surface mirror (as shown by A in FIG. 15). Thus, the light beam scans in 360 degrees around the axis of the curved surface mirror, i.e., around the optical axis of the image sensing apparatus. This scanning is referred to as main scanning.

The angle of the scanning mirror 15 is changed by a resolution in the sub scanning direction B per one period of the main scanning (a rotation in the direction A). This operation is repeated during one way sub scanning in the range of B' shown in FIG. 15, so that the 360 degrees range around the axis of the curved surface mirror can be scanned by the light beam in the range B'.

One period of the main scanning is set to less than exposure time of the image sensing apparatus 20f. The trace of the reflected light beam that was irradiated in all orientation within the beam irradiation angle, i.e., the argument φ of the scanning mirror 15 (in the direction of B in FIG. 15) can be imaged. In every image sensing the angle of the scanning mirror 15 is changed by the resolution in the sub scanning direction B. This operation is repeated while the above-mentioned barycenter image A (a set of pixels indicating time point TA) is generated. Then, the position of the irradiation system 10f is moved by a predetermined distance in the axis direction of the curved surface mirror (as shown by C in FIG. 15) by the moving mechanism 117, so that the barycenter image B (a set of pixels indicating time point TB) is generated by the above-mentioned operation.

The positions in the vertical direction and the depth direction are calculated by the triangulation principle by using the angle position of the scanning mirror 15 at each position of the irradiation system for each pixel and the distance of movement of the irradiation system 10f in accordance with the two barycenter images A, B. In addition, the orientation angle can be derived from each pixel and the image center position (position corresponding to the axis of the curved surface mirror). Thus, the three-dimensional position in the space can be calculated for each pixel in the image.

FIG. 16 shows a configuration of the all orientation three-dimensional measuring apparatus that uses the curved surface mirror 220 having a conical shape. The curved surface mirror 220 having an inner surface as a reflecting surface is disposed in such a way that the axis of the curved surface mirror 220 extends vertically. The contour of the mirror can be expressed by the following equation using coordinate axis h in the upward direction of the mirror axis, radius r of the mirror section for a certain height h and angle θm of the mirror surface with respect to the axis h.

$$r = h \times \tan \theta m + R$$

R represents a value of the radius r when the height h is zero. An object for data input (human body in the illustrated example) Q is disposed therein. Above the curved surface mirror 220, the image sensing apparatus 20g and the irradiation system 11g are disposed in such way that the optical axis thereof and the mirror axis are matched. The vertex angle of the truncated cone of the curved surface mirror 220, the distance to the image sensing apparatus 20g and the angle of view for image sensing are set appropriately, so that the image sensing apparatus 20g can obtain an image that is a 360 degrees image of the object Q except the top portion via the curved surface mirror 220. The irradiation system 11g can rotate the irradiation orientation of the light beam (in the direction of M1 in FIG. 16) about the axis of the mirror. This corresponds to the main scanning. Simultaneously, the irradiation angle θy of the light beam is scanned in the vertical plane (the direction of M2 in FIG. 16). This corresponds to the sub scanning. The scanning in the direction M1 is realized by utilizing a power source such as a motor so as to rotate a part or whole of the irradiation system 11g. The change of the direction M2 can be performed easily by using a scanning device such as a galvanoscanner. The size, shape and position in the vertical direction of the irradiation system 11g are determined so that it is within the middle circle range that has no influence to the three-dimensional data input and there is no reflecting surface of the mirror in the range of vision of the image sensing apparatus 20g.

The image of the point P on the object Q is supposed to be observed as a point Pi in the obtained image. Since the three-dimensional data input apparatus is symmetric, the following explanation is based on a fixed orientation angle for a simple explanation and noting a certain vertical section including the mirror axis.

It is supposed that the height h of the irradiation starting point of the light beam equals hx, and the light beam reaches the point P via the routes x and x' at a certain timing. The light beam of the irradiation angle θx passes the route x, and after reflected it passes the route x' that is expressed by the following equation.

$$r = h \times \tan(\theta x + 2\theta m) + [\tan \theta x (hx \tan \theta m + R) - \tan(\theta x + 2\theta m)(hx \tan \theta x - R)]/(\tan \theta m + \tan \theta x)$$

The point P exists on this route x'.

It is supposed that the height h of the irradiation starting point of the light beam equals hy, and the light beam reaches the point P via the routes y and y' at a certain timing. The light beam of the irradiation angle θy passes the route y, and after reflected it passes the route y' that is expressed by the following equation.

$$r = h \times \tan(\theta y + 2\theta m) + [\tan \theta y (hy \tan \theta m + R) - \tan(\theta y + 2\theta m)(hy \tan \theta x - R)]/(\tan \theta m + \tan \theta y)$$

The point P exists on this route y'.

As mentioned above, the position of the point P (point Pi in the image) that includes the position r in the depth direction and the position h in the vertical direction is defined as the cross point of the route x' and the route y'. Therefore, the position of point P can be calculated in accordance with the irradiation angles θx and θy of the light beam. The orientation angle can be derived from the point Pi and the image center position (the position corresponding to the axis of the curved surface mirror) in the image.

Therefore the three-dimensional position in the space for each pixel in the image can be calculated.

The process of the three-dimensional data input will be explained though a part thereof was explained above. One period of the above-mentioned main scanning is set to less than the exposure time of the image sensing apparatus 20f. The trace of the reflected light beam that was irradiated from all orientation within the beam irradiation angle, i.e., the argument θ of the scanning mirror (in the direction of M2 in FIG. 16) can be imaged. In every image sensing the angle of the scanning mirror is changed by the resolution in the sub scanning direction. This operation is repeated while the barycenter image A is generated. Then, the position of the irradiation system 11g is moved by a predetermined distance in the axis direction (in the direction of M3 in FIG. 16) of the curved surface mirror, so that the barycenter image B is generated by the above-mentioned operation.

The argument of the scanning mirror in each position of the irradiation system 11g for each pixel is derived from the two barycenter images A, B. The positions in the vertical direction and the depth direction are calculated by the triangulation principle by using these values and the distance of the movement of the irradiation system 11g in accordance with the two barycenter images A, B. In addition, the orientation angle can be derived from each pixel and the image center position (position corresponding to the axis of the curved surface mirror). Thus, the three-dimensional position in the space can be calculated for each pixel in the image.

Fifth Embodiment

Figure 17:
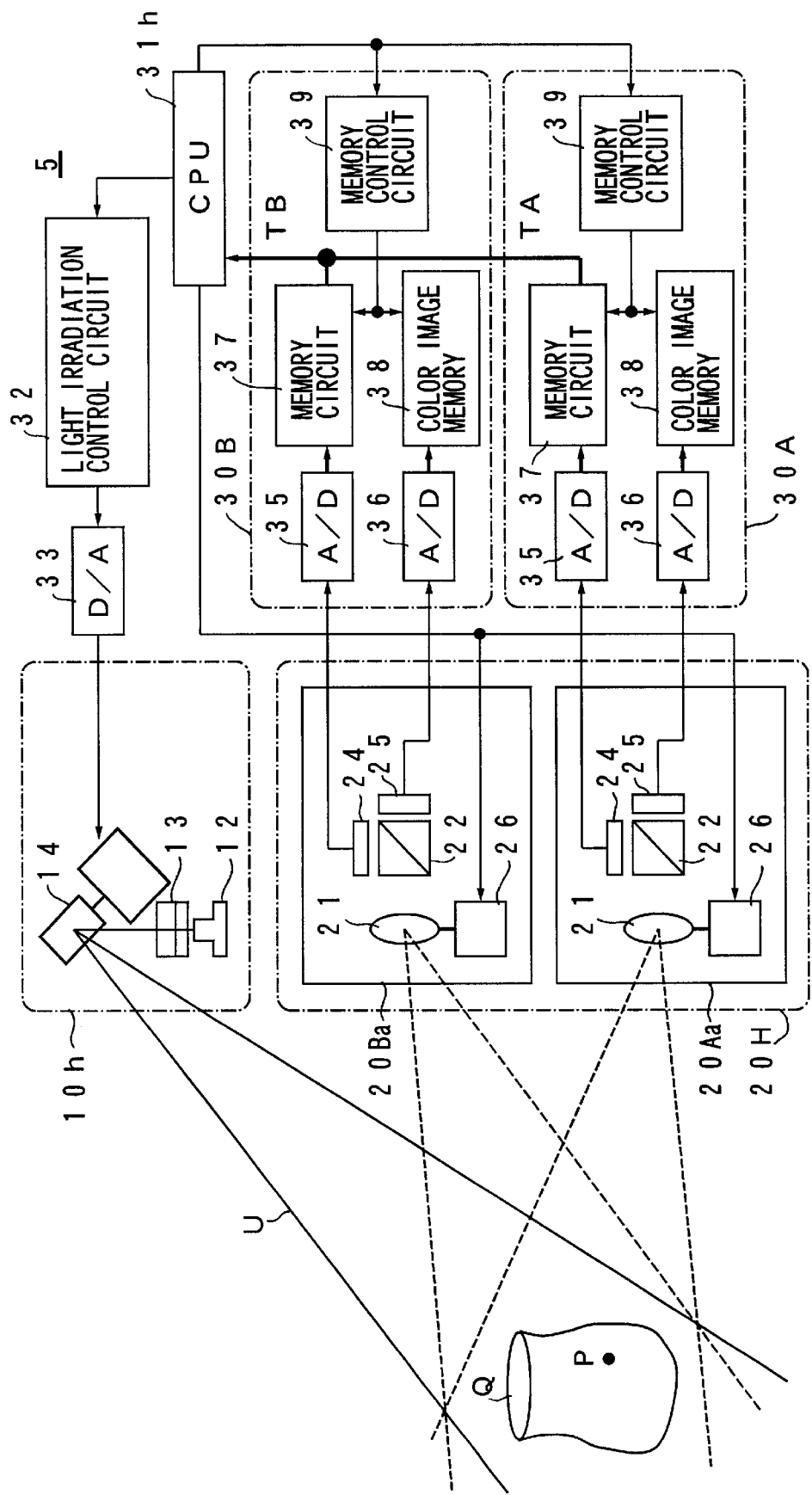
FIG. 17 is a functional block diagram of a three-dimensional data input apparatus 5 according to a fifth embodiment of the present invention.

FIG. 17 is a functional block diagram of a three-dimensional data input apparatus 5 according to a fifth embodiment of the present invention.

The three-dimensional data input apparatus 5 includes an irradiation system 10h that irradiates a slit light beam U, a light reception system 20H including two image sensing systems 20Aa, 20Ba having the same configuration with each other, and two received light signal processors 30A, 30B having the same configuration with each other.

The configuration of 10h is the same as that of 11 shown in FIG. 1 and each configuration of 2DAa, 20Ba is the same as that of 20a in FIG. 1.

The irradiation system 10h includes a semiconductor laser 12 as a light source, a group of lenses 13 for beam shaping and a galvanomirror 14 as a beam deflecting means for changing the irradiation angle. The group of lenses 13 includes a collimator lens and a cylindrical lens. The galvanomirror 14 is given a deflection control signal by a light irradiation control circuit 32 via a digital-to-analog converter 33.

The CPU 31h instructs control targets properly and reads data from the memory circuit 37 of each of the received light signal processors 30A, 30B so as to obtain distance image data by operation. The distance image data are output to an external equipment (not shown) as three-dimensional input data on proper timing. On this occasion, a two-dimensional color image that is memorized by the color image memory 38 of at least one of the received light signal processors 30A, 30B is also output.

Figure 18:
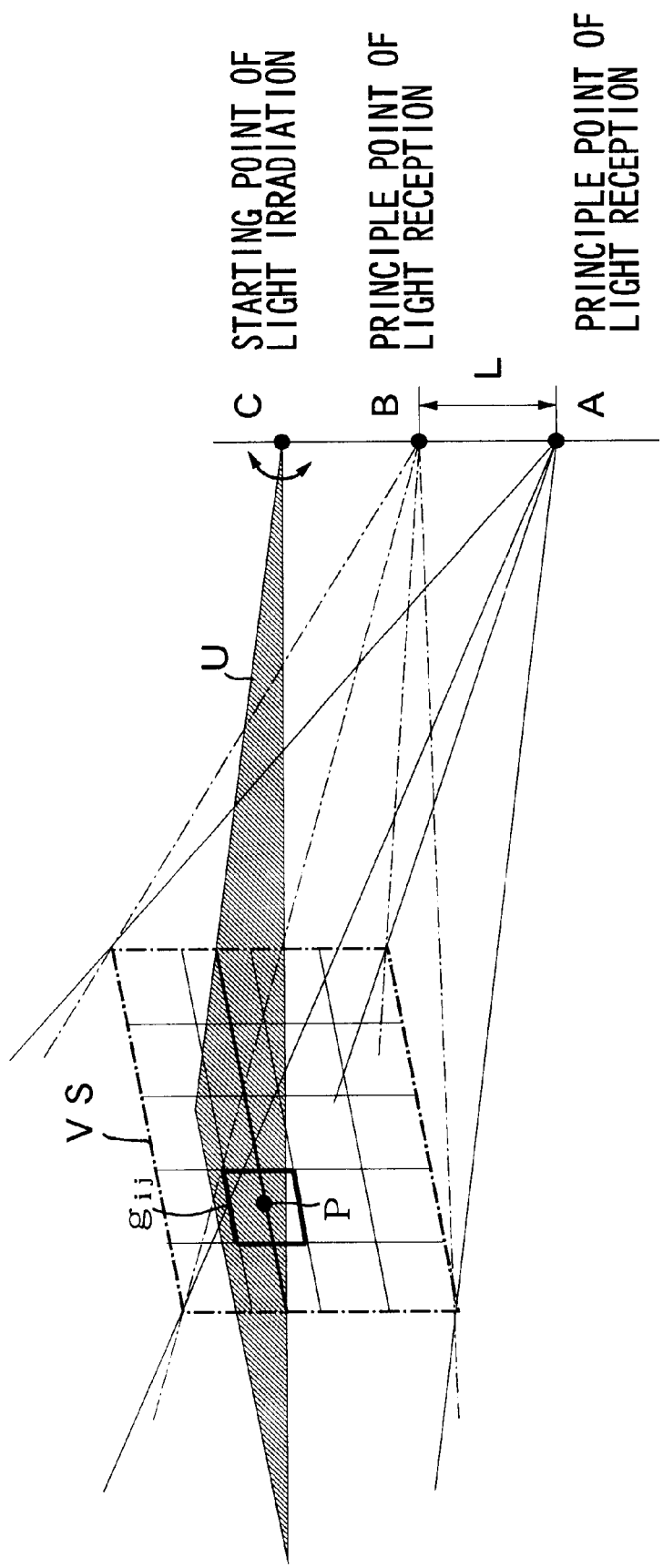
FIG. 18 is a schematic diagram of the irradiation.
Figure 19A:
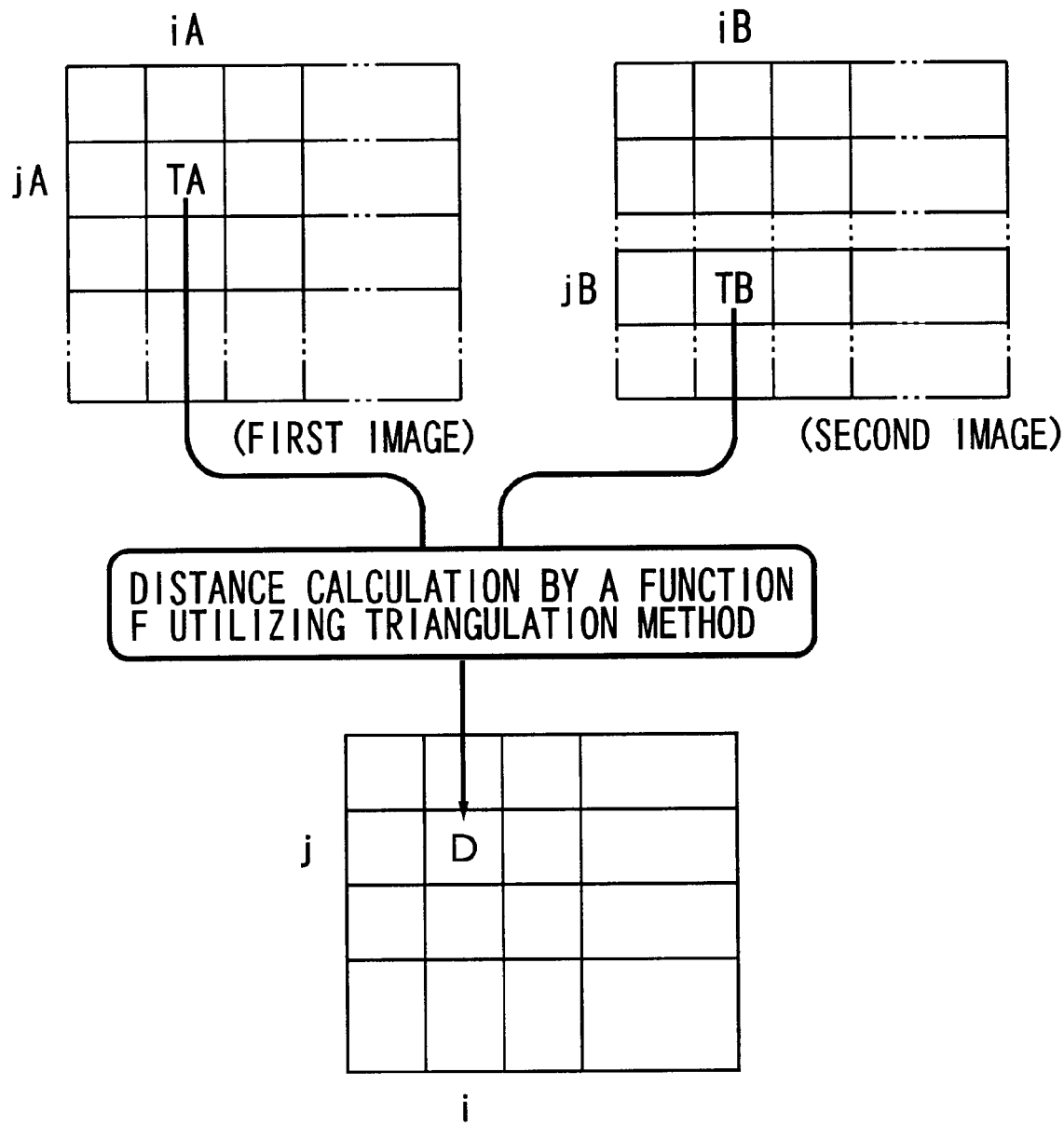
FIGS. 19(A) and 19(B) are diagrams for explaining how to generate the distance image data.
Figure 19B:
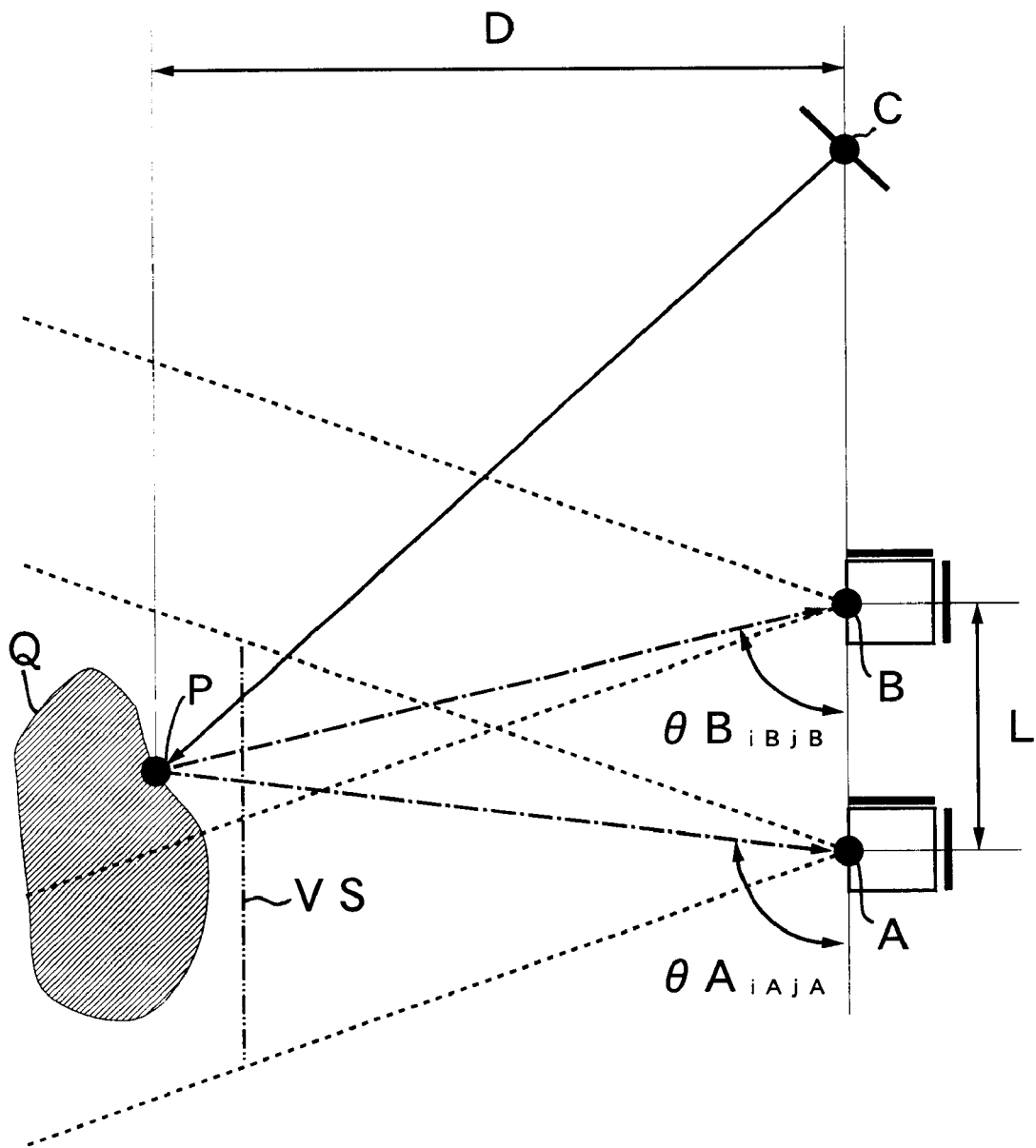

FIG. 18 is a schematic diagram of the irradiation, FIGS. 19(A) and 19(B) are diagrams for explaining how to generate the distance image data, and FIG. 20 is a diagram showing a parallax in image sensing.

The three-dimensional data input apparatus 5 irradiates the slit light beam U so as to scan the imaginary plane VS from a starting point C on a reflecting surface of the galvanomirror 14. In FIG. 18, the starting point C of light irradiation and the view points (principal point of light reception) A, B are aligned. The view points A, B is arranged in the vertical direction, and the longitudinal direction of the slit light beam U is regarded as the horizontal direction.

The three-dimensional data input of the object Q will be explained generally as follows.

The deflection angle of the galvanomirror 14 is controlled with synchronization with image sensing by the two image sensors 24 in the frame period. The two image sensors 24 are driven by the same timing. In other words, the object Q is imaged from the view points A, B simultaneously. It is detected which timing of irradiation of the slit light beam U deflected in sequence each pixel of the image sensor 24 was irradiated.

Noting the pixel $g_{iAjA}$ that is the iA-th in the horizontal direction and the jA-th in the vertical direction of the image sensor 24 of one image sensing system 20Aa, the output thereof becomes the maximum when the slit light beam U passes the point P on the line of sight corresponding to the pixel $g_{iAjA}$. Noting the output of the image sensor 24 of another image sensing system 20Ba, the output of the pixel $g_{iBjB}$ corresponding to the line of sight passing the point P becomes the maximum. Supposing that "epipola" restriction in the vertical direction is established in the first image taken by the image sensing system 20Aa and the second image taken by the image sensing system 20Ba, the position iB of the pixel $g_{iBjB}$ in the horizontal direction is determined uniquely to the position iA of the pixel $g_{iAjA}$ in the horizontal direction. The position jB of the pixel $g_{iBjB}$ in the vertical direction to the position jA of the pixel $g_{iAjA}$ in the vertical direction is determined by detecting the pixel whose output became the maximum at the same time when the output of the pixel $g_{iAjA}$ in the pixel array of the horizontal direction position iB in the second image became the maximum. Therefore, the pixel in the second image corresponding to each pixel in the first image can be found by determining time points (time points of peak intensity) $TA_{iAjA}$, $TB_{iBjB}$ when the output of each pixel of the image sensor 24 of the image sensing systems 20Aa, 20Ba becomes the maximum.

If the point P corresponds to the pixel $g_{iAjA}$ of the first image, the point P exists on the line that is defined by the light reception angle $\theta A_{iAjA}$ determined by the position of the pixel $g_{iAjA}$ and the space coordinates of the view point A. In the same way, if the point P corresponds to the pixel $g_{iBjB}$ of the second image, the point P exists on the line that is defined by the light reception angle $\theta B_{iBjB}$ determined by the position of the pixel $g_{iBjB}$ and the space coordinates of the view point B. Namely, the cross point of these two lines is the point P. Therefore, the distance $D_{iAjA}$ between the base line passing the view points A, B and the point P in the depth direction can be calculated in accordance with the light reception angles $\theta A_{iAjA}$, $\theta B_{iBjB}$ and the distance L between the view points, applying the principle of triangulation. Thus, the relative position between the view points A, B and the point P can be specified. The above-mentioned process is performed for each pixel g of the first image, so that information of three-dimensional position of the object Q for the number of pixels can be obtained.

Next, a concrete configuration of the circuit for detecting the time point of peak intensity. In the following explanation, the suffixes iAjA, iBjB indicating the pixel positions are omitted except the case where distinguishment of pixel positions is required.

Figure 21:
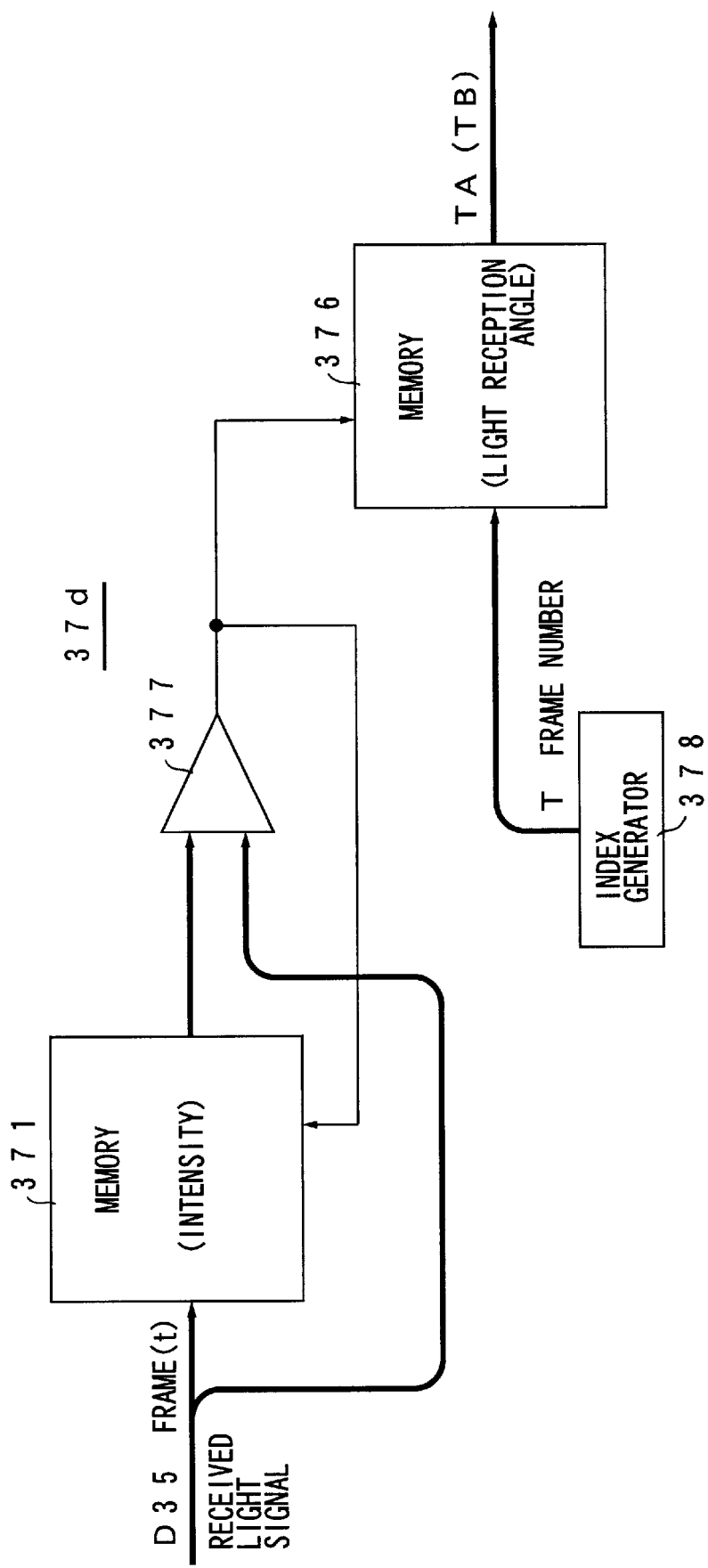
FIG. 21 is a block diagram of a first example of the memory circuit.

FIG. 21 is a block diagram of a fourth example of the memory circuit.

The memory circuit 37d in this example includes two memories 371, 376, a comparator 377 and an index generator 378.

The configuration of 37d is the same as that of 37 shown in FIG. 4. The frame number T memorized in the memory 376 corresponds to the above-mentioned time points $TA_{iAjA}$, $TB_{iBjB}$, which is information specifying the irradiation angles $\theta A_{iAjA}$, $\theta_{iBjB}$.

According to this example, the irradiation angles $\theta A_{iAjA}$, $\theta B_{iBjB}$ can be detected by the simple circuit. However, the resolution of detection for the irradiation angle depends on the pixel pitch of the image sensor 24. A fifth example that improves the resolution will be explained as follows.

Figure 22:
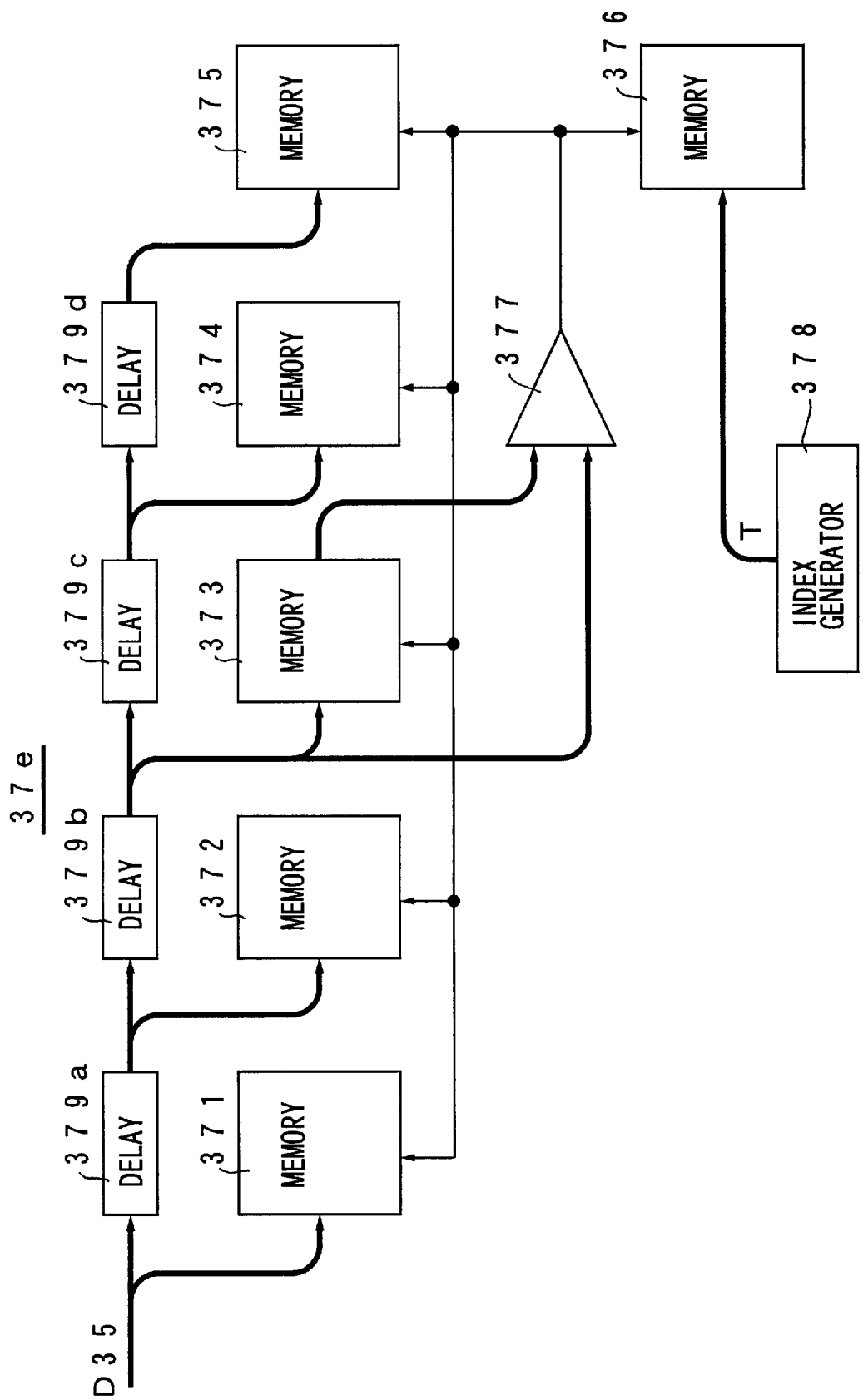
FIG. 22 is a block diagram of the memory circuit according to a second example.

FIG. 22 is a block diagram of the memory circuit according to the fifth example. The relationship between the distribution of intensity and the received light data is the same as in FIG. 6 that is referred to in the first embodiment. In FIG. 22 the element corresponding to that shown in FIG. 21 is denoted by the same numerals as in FIG. 21.

The configuration and function of 37e of the fifth example are the same as those of 37b shown in FIG. 5.

Figure 23:
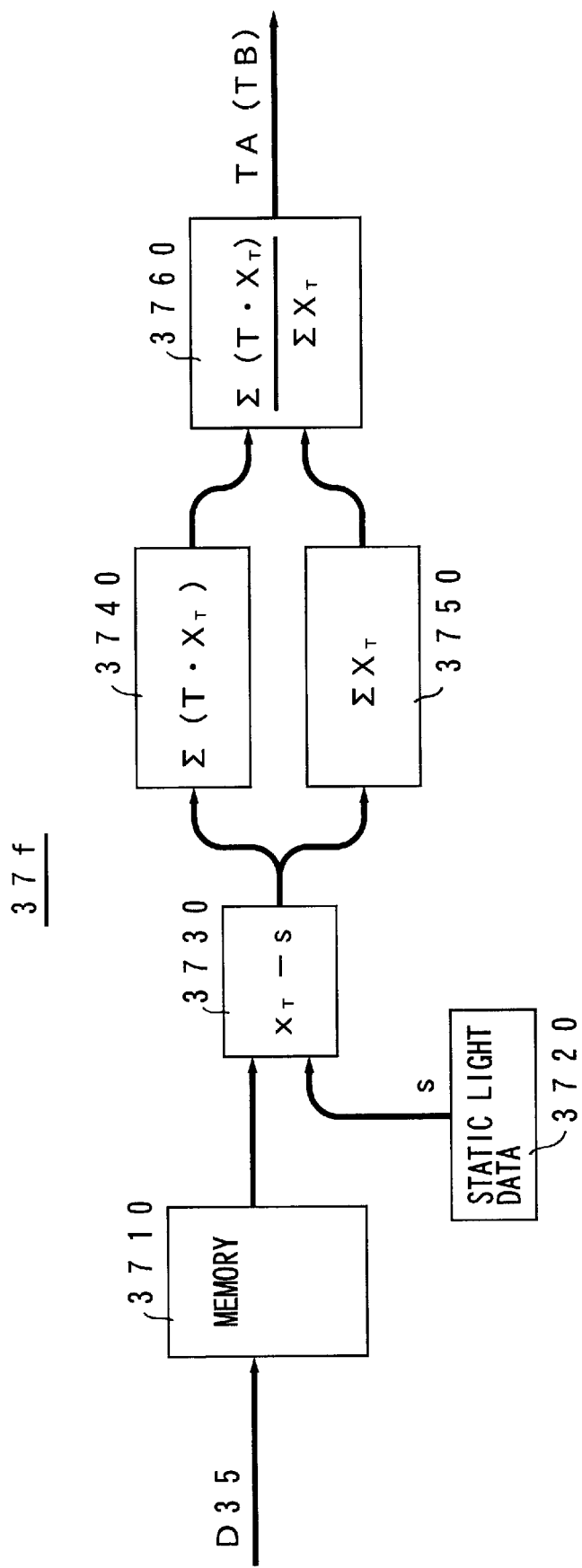
FIG. 23 is a block diagram of the memory circuit according to a third example.

FIG. 23 is a block diagram of the memory circuit according to a sixth example. A schematic diagram of the barycenter in FIG. 23 is the same as FIG. 8 that was referred to in the first embodiment.

The configuration and the function of 37f of the sixth example are the same as those of 37c shown in FIG. 7.

FIGS. 24(A)–24(D) are diagrams showing an example of setting the relative position between the light irradiation and the light reception.

Figure 24A:
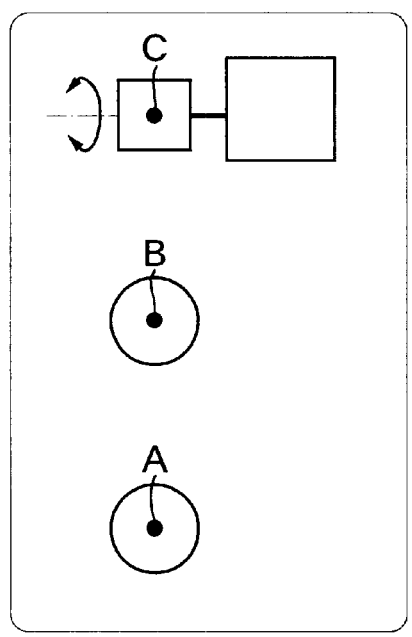
FIGS. 24(A)–24(D) are diagrams showing an example of setting the relative position between the light irradiation and the light reception.
Figure 24B:
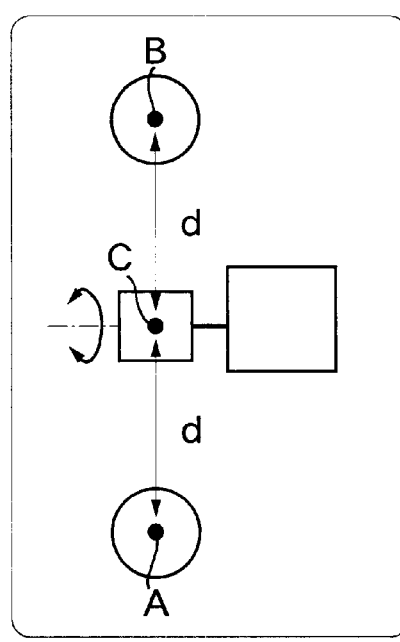
Figure 24C:
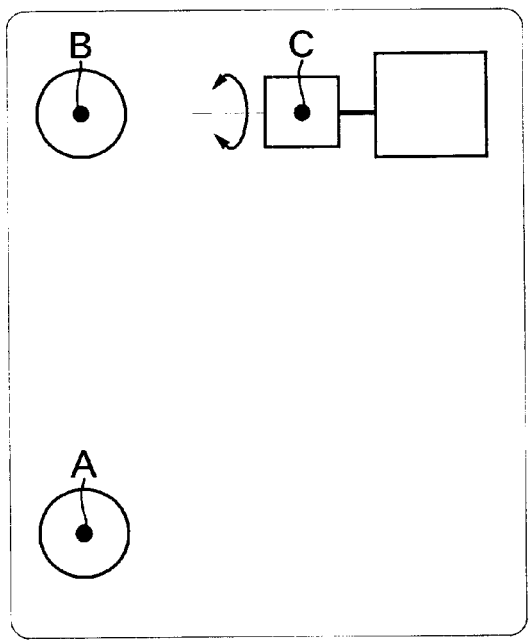
Figure 24D:
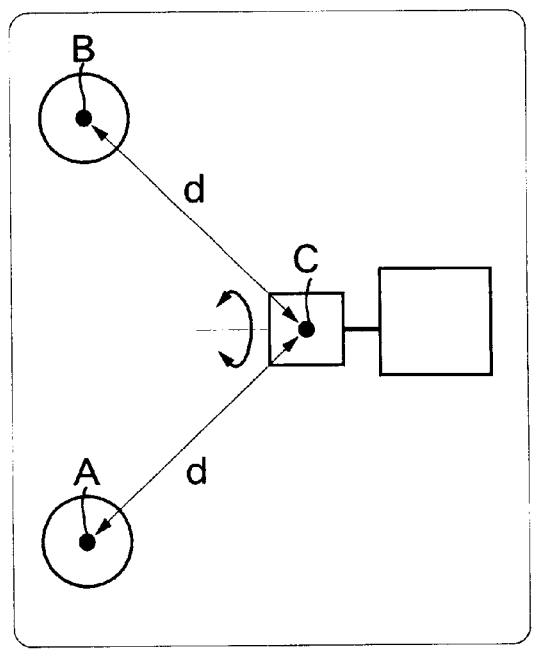

Concerning the arrangement of the irradiation system 10h and the light reception system 20H, it is not always necessary that the starting point C of the light irradiation and the principal point of the light reception (view point) C are aligned as shown in FIG. 24(A) or FIG. 24(B). For example, the arrangement shown in FIG. 24(C) in which the three points A, B, C are arranged in L shape or the arrangement shown in FIG. 24D in which the three points A, B, C are arranged in T shape can be adopted. Especially, if the starting point C is disposed between the view point A and the view point B as shown in FIG. 24(B) or FIG. 24(D), an occlusion due to the different position of the view points A, B and the starting point C can be reduced. In this case, it is desirable that the distances D between the starting point C of light irradiation and the view point A is the identical to that between the starting point C and the view points B.

Sixth Embodiment

FIG. 25 is a functional block diagram of a three-dimensional data input apparatus 6 according to a sixth embodiment of the present invention. In FIG. 25 and other following figures, the element denoted by the same numerals as in FIG. 17 has the same function as the above-mentioned three-dimensional data input apparatus 5.

The sixth embodiment uses not s slit light beam but a spot light beam V having a spot-like section for image sensing by a one-dimensional image sensor (a linear sensor) 27.

The three-dimensional data input apparatus 6 includes an irradiation system 10i, a light reception system 20I including two image sensing systems 20Ac, 20Bc having the same configuration with each other, and two received light signal processors 30Ac, 30Bc having the same configuration with each other. The irradiation system 10i includes a semiconductor laser 12, a collimator lens 13c and a galvanomirror 14c.

Each configuration of 20Ac, 20Bc is the same as that of 20c shown in FIG. 11.

The three-dimensional data input apparatus 5 can be used for an optical system as same as the optical system 41 shown in FIGS. 14(A), 14(B). The apparatus assembled as shown in FIGS. 14(A), 14(B) using the three-dimensional data input apparatus 5 can perform 360 degrees input and all orientation input.

Figure 26:
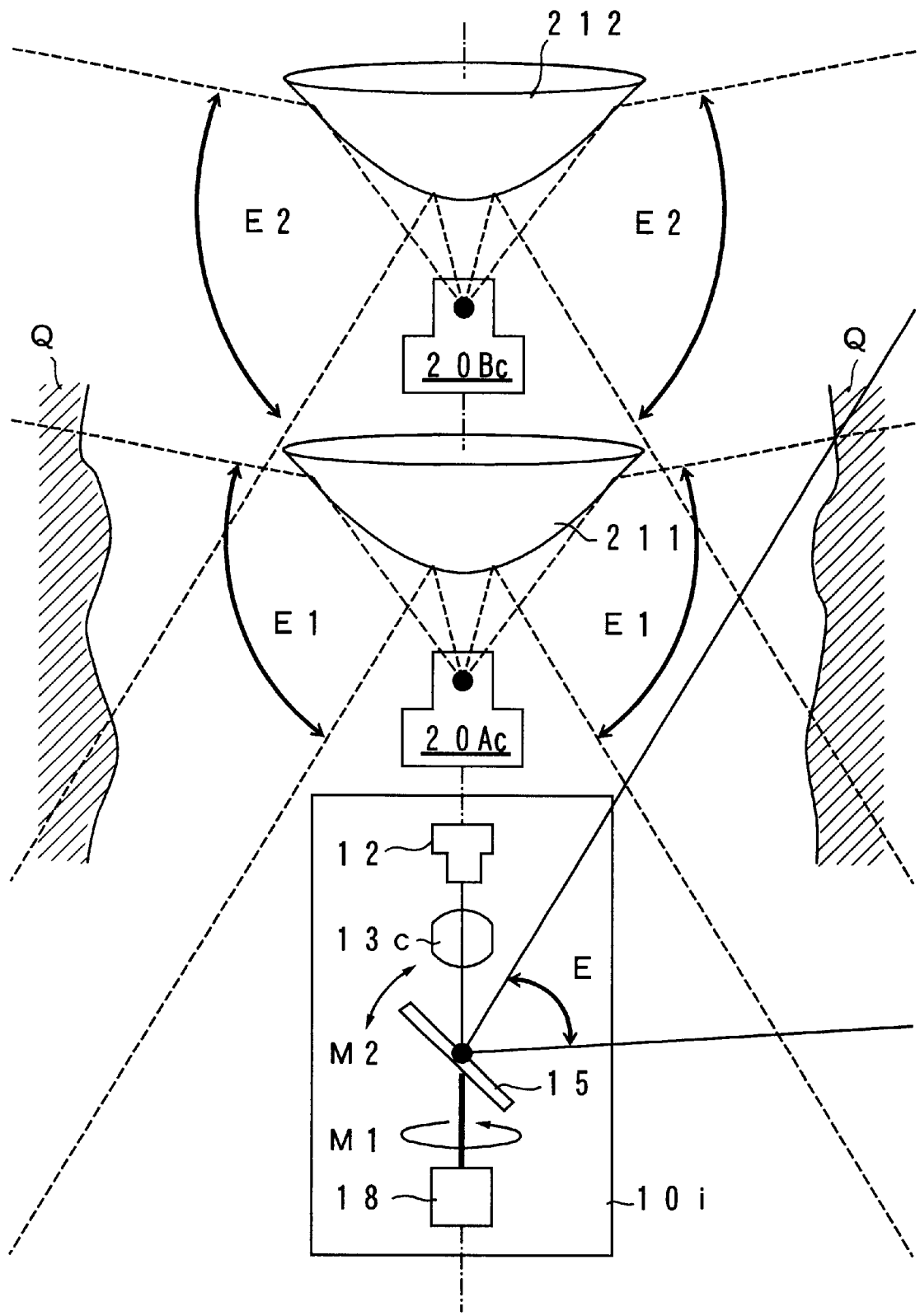
FIG. 26 is a diagram of a configuration of the apparatus that realizes all orientation input by using a mirror.
Figure 27:
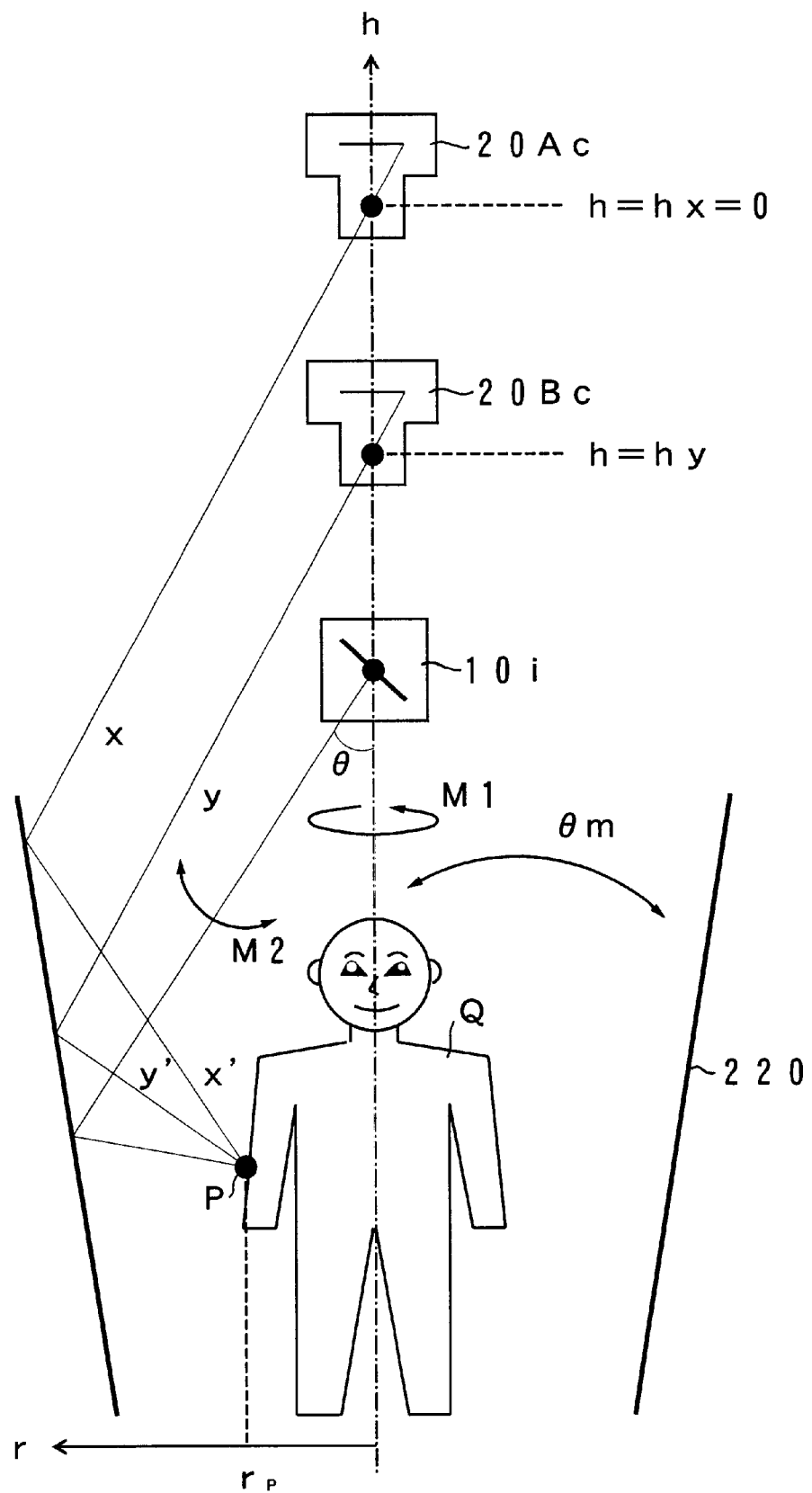
FIG. 27 is a diagram of a configuration of the apparatus that realizes 360 degrees input by using a mirror.

FIGS. 26 and 27 are diagrams of a configuration of the apparatus that realizes all orientation input (see FIG. 26) and 360 degrees input (see FIG. 27) by using a mirror.

FIG. 26 shows a configuration of an all orientation three-dimensional measuring apparatus that utilizes a convex type curved surface mirrors 211, 212. The curved surface mirrors 211, 212 are disposed concentrically with their reflecting surfaces facing downward. Below each of the curved surface mirrors 211, 212, an image sensing apparatus (e.g., video camera) 20Ac, 20Bc is disposed in such a way that the optical axis thereof matches the mirror axis. Each of the curved surface mirrors 211, 212 has a curved contour of the section including the axis. The curved contour is symmetric with respect to the axis and the gradient of the curve increases simply as a hyperbola. Thus, 360 degrees image around the axis within the range E1, E2 shown in FIG. 27 except the range of the optical system itself including the image sensing apparatuses 20Ac, 20Bc and the irradiation system 10i is taken into the image sensing apparatuses 20Ac, 20Bc.

The irradiation system 10i is disposed on the axis of the curved surface mirrors 211, 212, and includes a light source 12, a lens 13c, a scanning mirror 15 and a mirror rotation mechanism 18. A light beam emitted from the light source 12 is collimated into a beam having a proper diameter by the lens 13c and is irradiated after reflected by the scanning mirror 15. The angle of the scanning mirror 15 can be controlled around the axis perpendicular to the axis of the curved surface mirror (as shown by M2 in FIG. 26), so that the irradiated light beam can be deflected in the angle range E. The scanning by this deflection is referred to as sub scanning. For example, a scanning mirror 15 having an angle control mechanism such as a galvanoscanner can be used for realizing the sub scanning.

The mirror rotation mechanism 18 rotates the scanning mirror 15 in the sub scanning by itself or along with at least one of the lens 13c and the light source 12 around the axis of the curved surface mirror (as shown by M1 in FIG. 26). Thus, the light beam scans in 360 degrees around the axis of the curved surface mirror, i.e., around the optical axis of the image sensing apparatus. This scanning is referred to as main scanning.

The angle of the scanning mirror 15 is changed by a resolution in the sub scanning direction M2 per one period of the main scanning (a rotation in the direction M1). This operation is repeated during one way sub scanning in the angle range of E, so that the 360 degrees range around the axis of the curved surface mirror can be scanned by the light beam in the angle range E.

One period of the main scanning is set to less than exposure time of the image sensing apparatuses 20Ac, 20Bc. The trace of the reflected light beam that was irradiated in all orientation within the beam irradiation angle, i.e., the argument φ of the scanning mirror 15 in the direction of M2 can be imaged. In every image sensing the angle of the scanning mirror 15 is changed by the resolution in the sub scanning direction M2. This operation is repeated while the above-mentioned barycenter image A (a set of pixels indicating time point TA) is generated, and the barycenter image B as the second image (a set of pixels indicating time point TB) is generated.

In the two time barycenter images A, B, "epipola" restriction is established in the radial direction with respect to the image center position (the position corresponding to the axis of the curved surface mirror). The barycenter image A is used as a reference, so as to get the pixel of the barycenter image B corresponding to each pixel g in the barycenter image A. The line of sight for each pixel g (equation of the line) is derived from the relative position between the curved surface mirrors 211, 212 and the image sensing apparatuses 20Ac, 20Bc, and the equation defining the shape of the curved surface mirrors 211, 212. The cross point of the lines of sight for the pixels corresponding to the barycenter images A, B is derived, so as to obtain the positions of the object Q in the vertical direction and the depth direction. In addition, the orientation angle can be derived from each pixel g of the barycenter image A and the image center position. Therefore, it is possible to calculate the three-dimensional position in the space for each pixel g in the barycenter image A.

FIG. 27 shows a configuration of the 360 degrees three-dimensional measuring apparatus that uses the curved surface mirror 220 having a conical shape.

The basic function of the apparatus shown in FIG. 27 is the same as that of the apparatus shown in FIG. 16. Above the curved surface mirror 220, the image sensing apparatuses 20Ac, 20Bc and the irradiation system 11i are disposed in such way that the optical axis thereof and the mirror axis are matched. The vertex angle of the truncated cone of the curved surface mirror 220, the distances to the image sensing apparatuses 20Ac, 20Bc and the angle of view for image sensing are set appropriately, so that the image sensing apparatuses 20Ac, 20Bc can obtain an image that is a 360 degrees image of the object Q except the top portion via the curved surface mirror 220. The size, shape and position in the vertical direction of the irradiation system 10i are determined so that it is within the middle circle range that has no influence to the three-dimensional data input and there is no reflecting surface of the mirror in the range of vision of the image sensing apparatuses 20Ac and 20Bc.

The image of the point P on the object Q is supposed to be observed as a point PAi having image height $r_{PA}$ in the image obtained by the image sensing apparatus 20Ac. Since the three-dimensional data input apparatus is symmetric, the following explanation is based on a fixed orientation angle for a simple explanation and noting a certain vertical section including the mirror axis.

The point P exists on the line x' that is expressed by the following equation.

$$r = h \tan[a \tan(r_{PA}/H) + 2\theta m] + Rhx[H \tan(a \tan(r_{PA}/H) + 2\theta m) + r_{PA}]/(H \tan \theta m + r_{PA})$$

Here, h=hx=0 (principal point position of the lens system of the image sensing apparatus 20Ac), H is distance between the principal point and the image sensing surface, and Rhx is a value of r for h=hx.

It is supposed that the image of the point P on the object Q is observed as the point PBi having the image height $r_{PB}$ from the image center position in the image taken by the image sensing apparatus 20Bc. In this case, the point P exists on the line y' expressed by the following equation.

$$r = h \tan[a \tan(r_{PB}/H) + 2\theta m] + Rhy[H \tan(a \tan(r_{PB}/H) + 2\theta m) + r_{PB}]/(H \tan \theta m + r_{PB})$$

Here, h=hx=0 (principal point position of the lens system of the image sensing apparatus 20Ac), H is distance between the principal point of the lens system of the image sensing apparatus 20Bc and the image sensing surface, and Rhy is a value of r for h=hx.

Thus, the position of the point P (point Pi in the image) that includes the position r in the depth direction and the position h in the vertical direction is defined as the cross point of the line x' and the line y'. Therefore, the position of point P can be calculated in accordance with the points PAi, PBi observed by the image sensing apparatuses 20Ac, 20Bc. Since the orientation angle can be derived from the point PAi and the image center position, the three-dimensional position of the image sensing surface in the space for each pixel can be calculated.

The process of the three-dimensional data input will be explained though a part thereof was explained above. One period of the main scanning is set to less than the exposure time of the image sensing apparatuses 20Ac, 20Bc. The trace of the reflected light beam that was irradiated toward all orientation within the beam irradiation angle, i.e., the argument θ of the scanning mirror 15 can be imaged in one main scanning. In every image sensing the argument θ is changed by the resolution in the sub scanning direction M2. This operation is repeated while the barycenter image A is generated as the above-mentioned first image using the image sensing apparatus 20Ac, and the barycenter image B is generated as the above-mentioned second image using the image sensing apparatus 20Bc.

In the two time barycenter images A, B, "epipola" restriction is established in the radial direction with respect to the image center position. The barycenter image A is used as a reference, so as to get the pixel of the barycenter image B corresponding to each pixel in the barycenter image A (in the direction where the "epipola" restriction is established). The line of sight for each pixel (equation of the line) is derived from the relative position between the curved surface mirror 220 and the image sensing apparatuses 20Ac, 20Bc, and the equation defining the shape of the curved surface mirror 220. The cross point of the lines of sight for the pixels corresponding to the barycenter images A, B is derived, so as to obtain the positions of the object Q in the vertical direction and the depth direction. In addition, the orientation angle can be derived from each pixel of the barycenter image A and the image center position. Therefore, it is possible to calculate the three-dimensional position in the space for each pixel in the barycenter image A.

Seventh Embodiment

Figure 28:
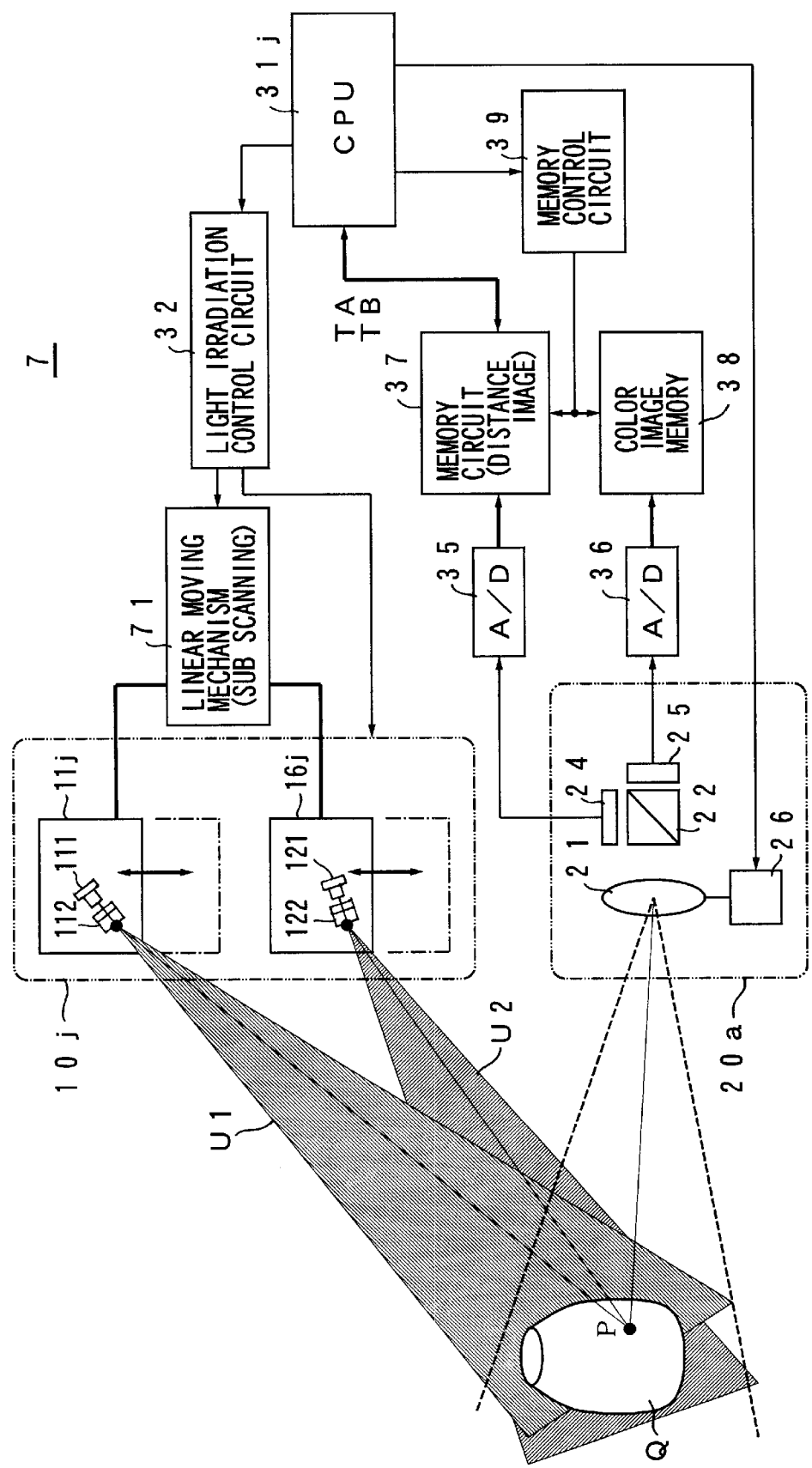
FIG. 28 is a functional block diagram of a three-dimensional data input apparatus 7 according to a seventh embodiment of the present invention.

FIG. 28 is a functional block diagram of a three-dimensional data input apparatus 7 according to a seventh embodiment of the present invention.

The three-dimensional data input apparatus 7 includes an irradiation system 10j having two light irradiation mechanisms 11j, 16j, a linear moving mechanism 71 for moving the light irradiation mechanisms 11j, 16j in one direction, and an image sensing system 20a that can perform zooming and focusing functions.

The basic function of the three-dimensional data input apparatus 7 is the same as that of the three-dimensional data input apparatus 1 shown in FIG. 1.

The light irradiation mechanism 11j includes a semiconductor laser 111 as a light source and a group of lenses 112 for irradiating a slit light beam. The group of lenses 112 are made up of a collimator lens and a cylindrical lens. In the same way, the light irradiation mechanism 16j includes a semiconductor laser 121 and a group of lenses 122. The light irradiation control of the semiconductor lasers 111, 121 and the drive control of the linear moving mechanism 71 is performed by the light irradiation control circuit 32.

Figure 29:
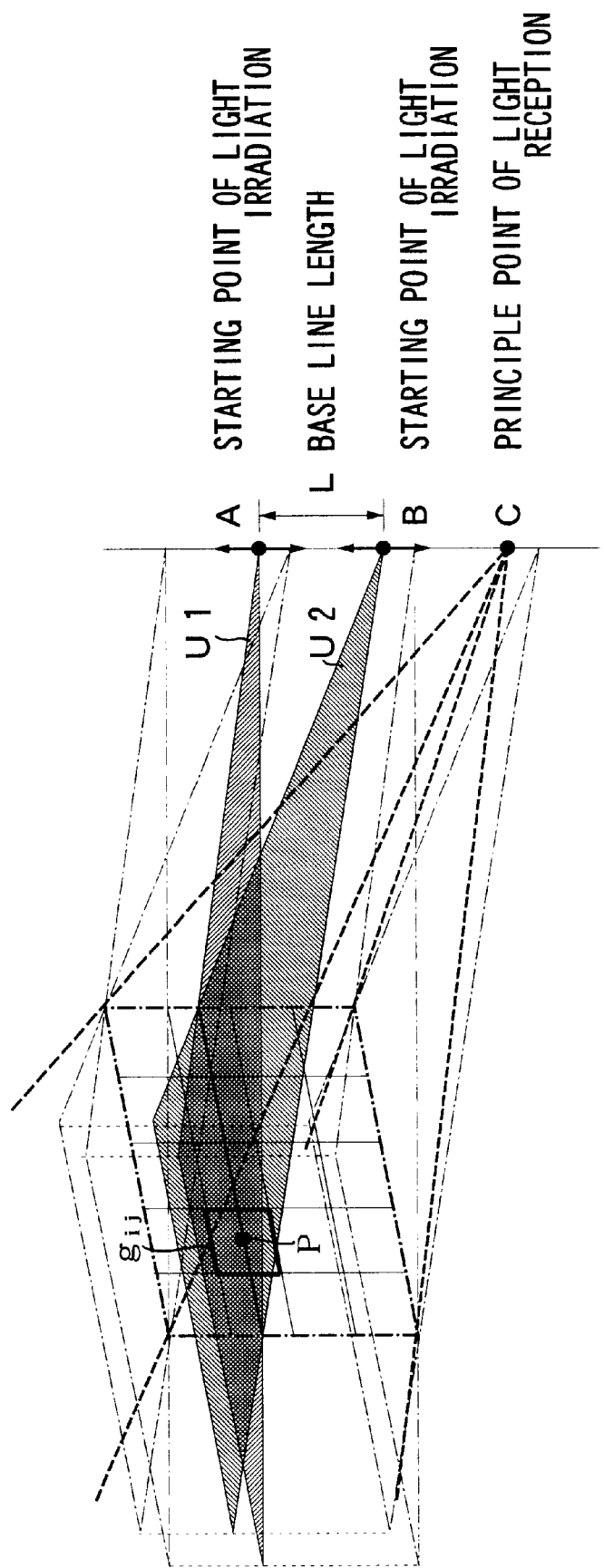
FIG. 29 is a schematic diagram of the irradiation.
Figure 30A:
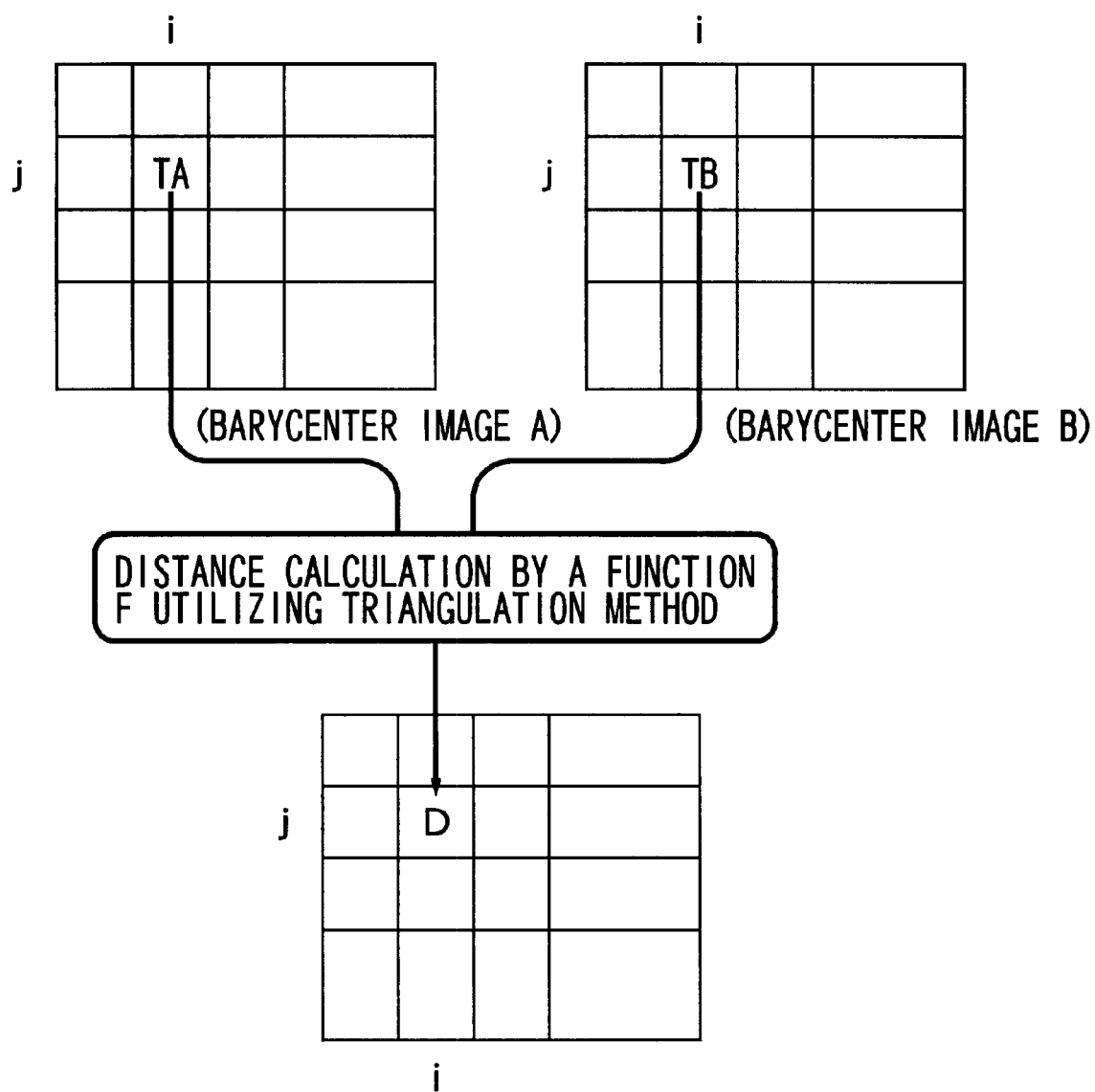
FIGS. 30(A) and 30(B) are diagrams for explaining how to generate the distance image data.
Figure 30B:
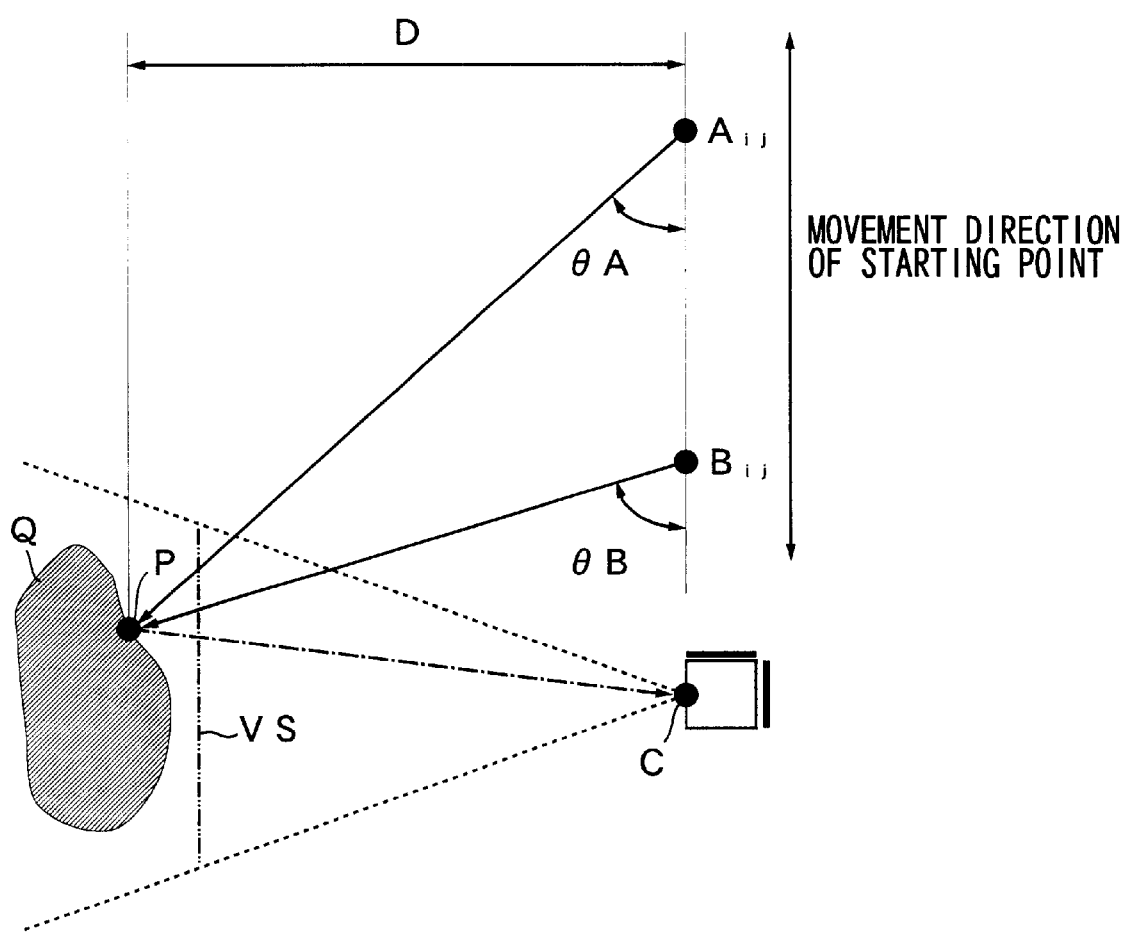

FIG. 29 is a schematic diagram of the irradiation, and FIG. 30 is a diagram for explaining how to generate the distance image data.

The three-dimensional data input apparatus 7 irradiates a slit light beam U1 from a starting point A toward the imaginary plane VS in a constant irradiation angle (θA). The irradiation angle is kept and the starting point A is moved in one direction, so that the imaginary plane VS is scanned. The longitudinal direction of the slit is the direction of main scanning, while the moving direction of the starting point A is the direction of sub scanning. In addition, a slit light beam U2 is irradiated from a starting point B toward the imaginary plane VS in a constant irradiation angle (θB). The irradiation angle is kept, and the starting point B is moved in one direction, so that the imaginary plane VS is scanned.

The three-dimensional data input of the object Q will be explained generally as follows.

The starting point A is moved in a constant speed with synchronization with image sensing by the image sensor 24 in the frame period. It is detected which time point of irradiation of the slit light beam U1 moving in the sub scanning direction (the vertical direction) in sequence each pixel of the image sensor 24 was irradiated. The object to which the slit light beam U1 is irradiated is imaged by the image sensor 24. Noting the pixel $g_{ij}$ that is located at the i-th column and the j-th row out of the I×J pixels g, the output thereof becomes the maximum when the slit light beam U1 passes the point P corresponding to the pixel $g_{ij}$. In other words, the point P exists on the plane that is defined by the space coordinates of the starting point $A_{ij}$ at the time point TA when the output of the pixel $g_{ij}$ becomes the maximum and the known irradiation angle θA of the slit light beam U1 (see FIG. 30).

Using a memory circuit such as the memory circuit 37 in FIG. 4, the positions of starting points A, B can be detected by the simple circuit. However, in that case, the resolution of detection for the positions of starting points A, B depends on the pixel pitch of the image sensor 24. The second example of the memory circuit explained in the first embodiment with referred to FIGS. 5, 6(A) and 6(B) is also useful in the present embodiment, and can improves the resolution.

In addition, the third example of the memory circuit explained in the first embodiment with referred to FIGS. 7 and 8 is also useful in the present embodiment, and can reduce the influence of noises.

Figure 31:
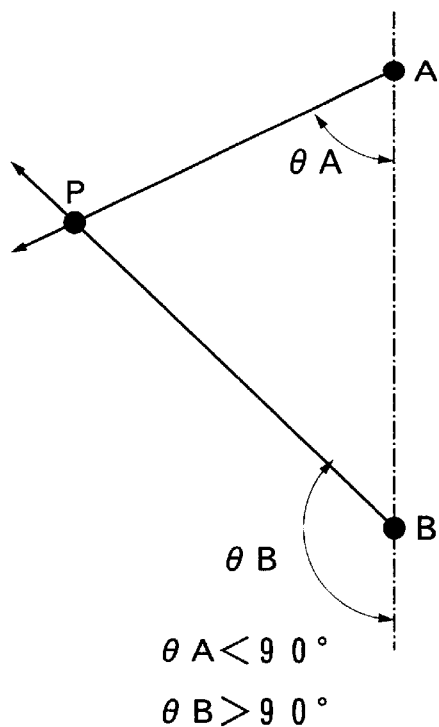
FIGS. 31(A), 31(B) and 31(C) are diagrams showing an example of setting the irradiation angle.
Figure 31:
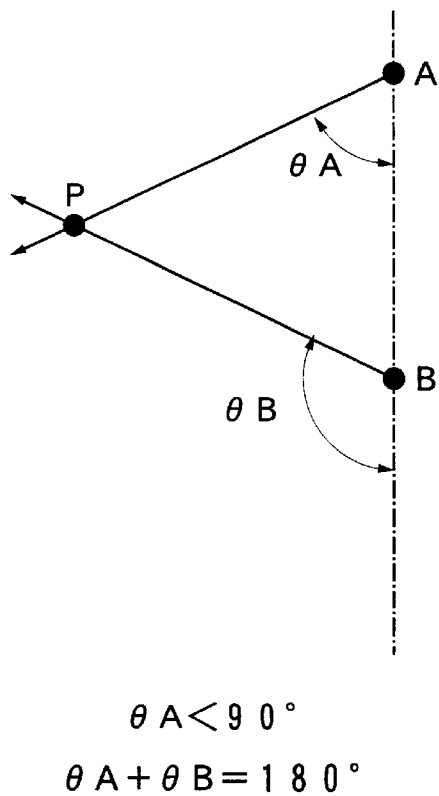
Figure 31:
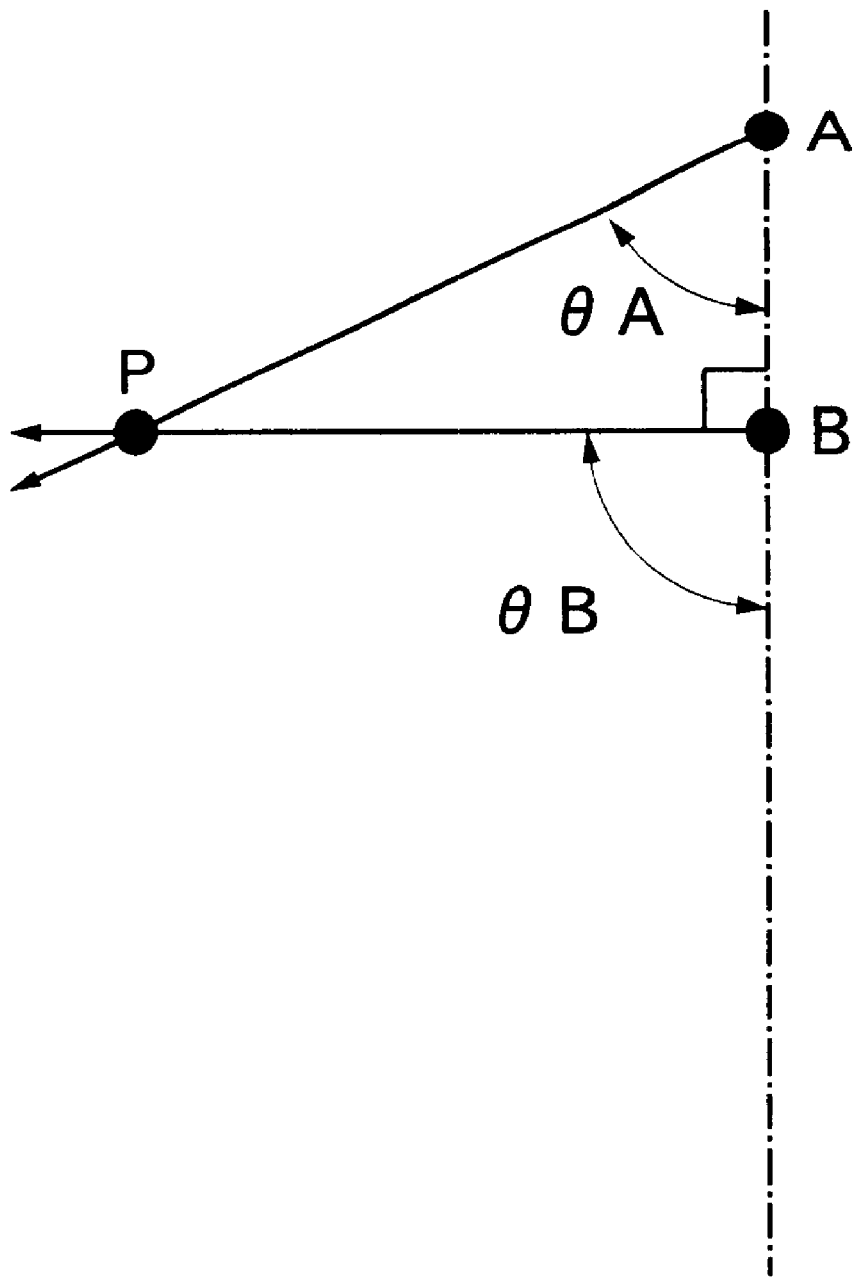

FIGS. 31(A), 31(B) and 31(C) are diagrams showing an example of setting the irradiation angle.

The movement range of the irradiation angles θA, θB and the starting points A, B are selected so that the point P on the object Q can be irradiated from different directions in accordance with the sizes of the object Q and the apparatus. Preferably, reduction of the occlusion is considered in the selection. Supposing the right-handed angle to the line passing the starting points A, B is regarded as the irradiation angle, the irradiation angle θA is an acute angle, and the irradiation angle θB is an obtuse angle in FIG. 31(A). In FIG. 31(B), sum of the irradiation angles θA, θB is 180 degrees. In other words, the starting point A, the starting point B and the point P make up an isosceles triangle having equal angles of irradiation angles θA, θB. In FIG. 31(C), the irradiation angle θB is 90 degrees.

Figure 32A:
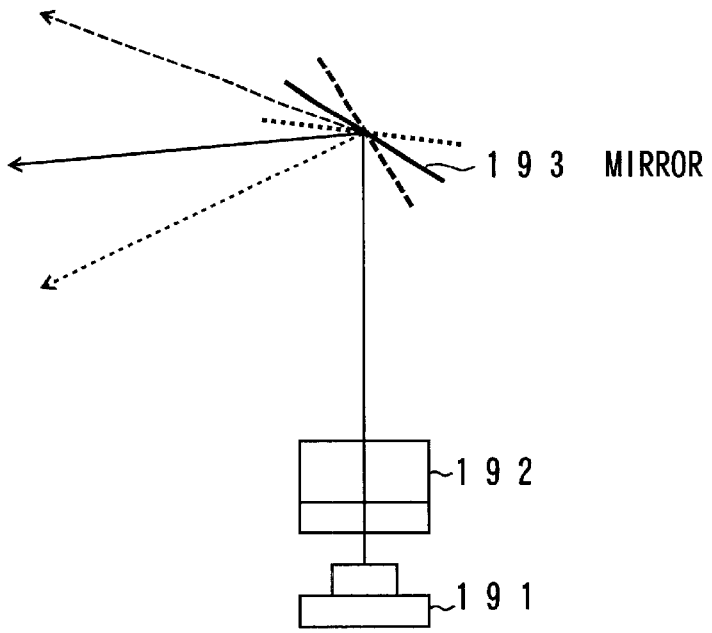
FIGS. 32(A) and 32(B) show a method for switching the irradiation angle in the case where a single light source is used.
Figure 32B:
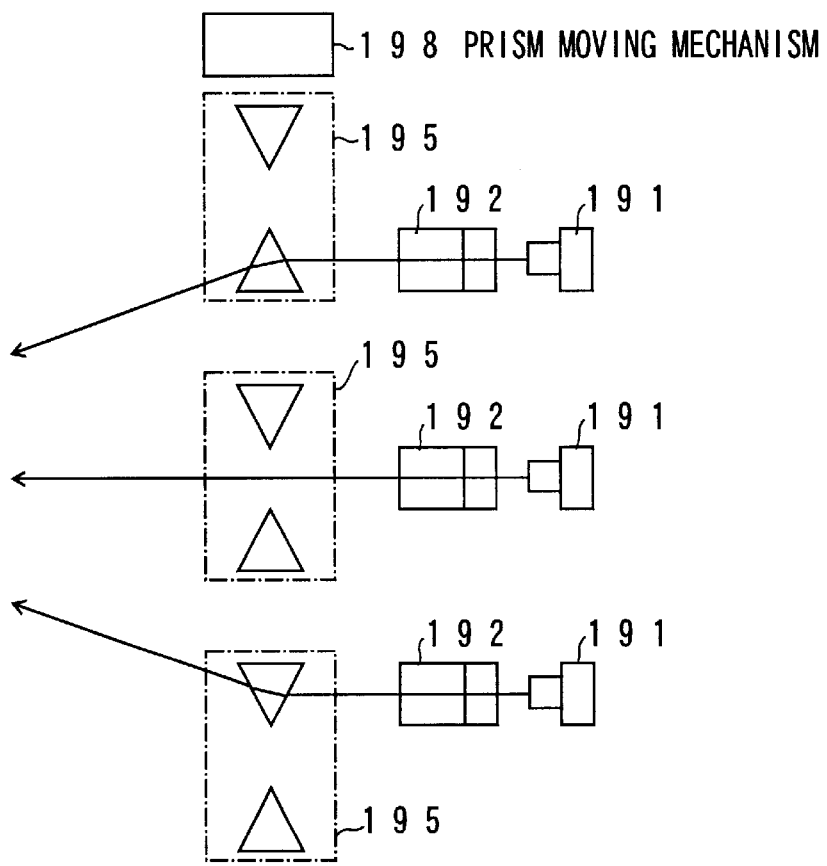

FIGS. 32(A) and 32(B) show a method for switching the irradiation angle in the case where a single light source is used.

Though each of the starting points A, B is provided with a light source in the configuration shown in FIG. 28, a single light source can irradiate in different angles.

As shown in FIG. 32(A), the light beam obtained by the light source 191 and the group of lenses 192 is reflected by the mirror 193 to irradiate the object. By rotating the mirror 193 any irradiation angle can be set. In this case, the mirror 193 is moved relatively to the object so as to perform the sub scanning. The range of the position in the relative movement depends on the irradiation angle. Along with the mirror 193, the group of lenses 192, or the light source 191 and group of lenses 192 can be moved relatively.

By using a refraction unit 195 having a pair of prisms and a prism moving mechanism 198 as shown in FIG. 32(B), at least three ways of switching of the irradiation angle can be performed.

Eighth Embodiment

Figure 33:
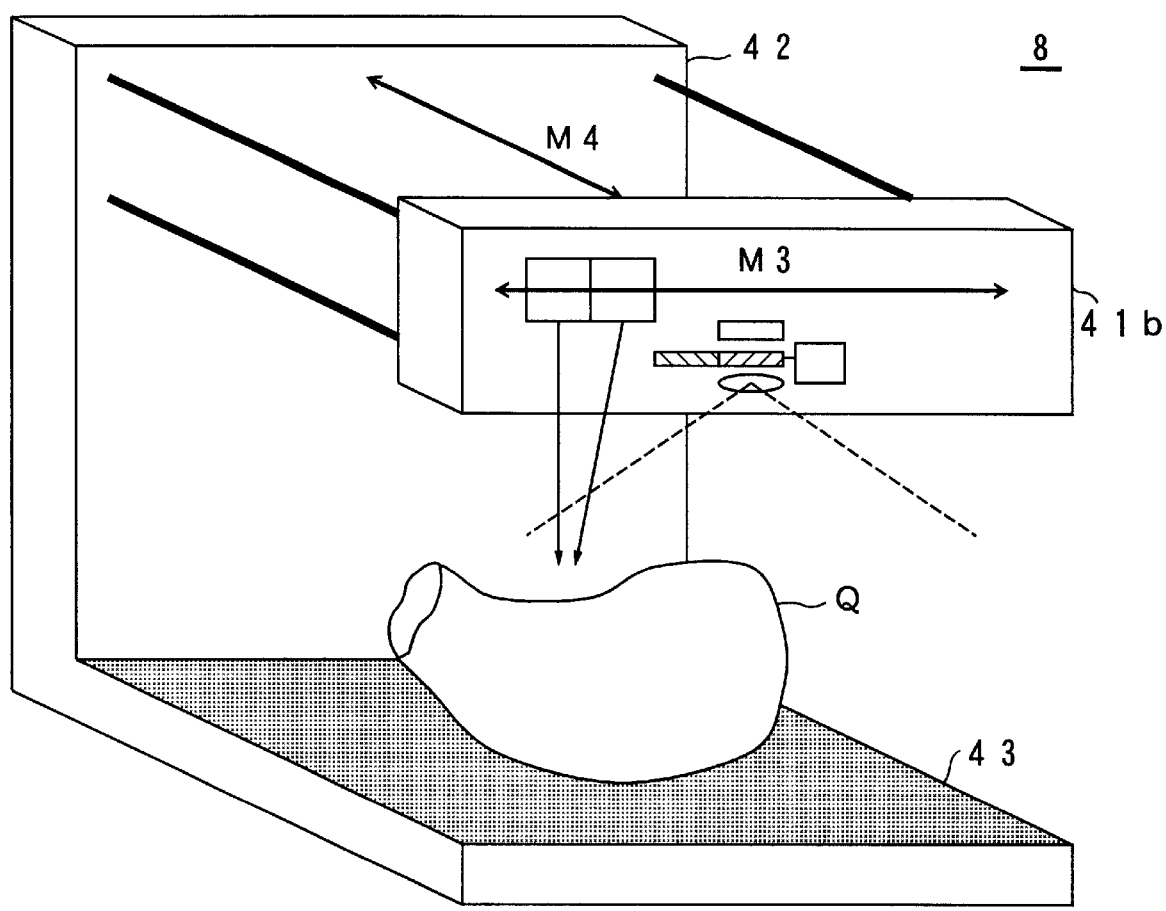
FIG. 33 is a schematic diagram of a three-dimensional data input apparatus 8 according to an eighth embodiment of the present invention.
Figure 34:
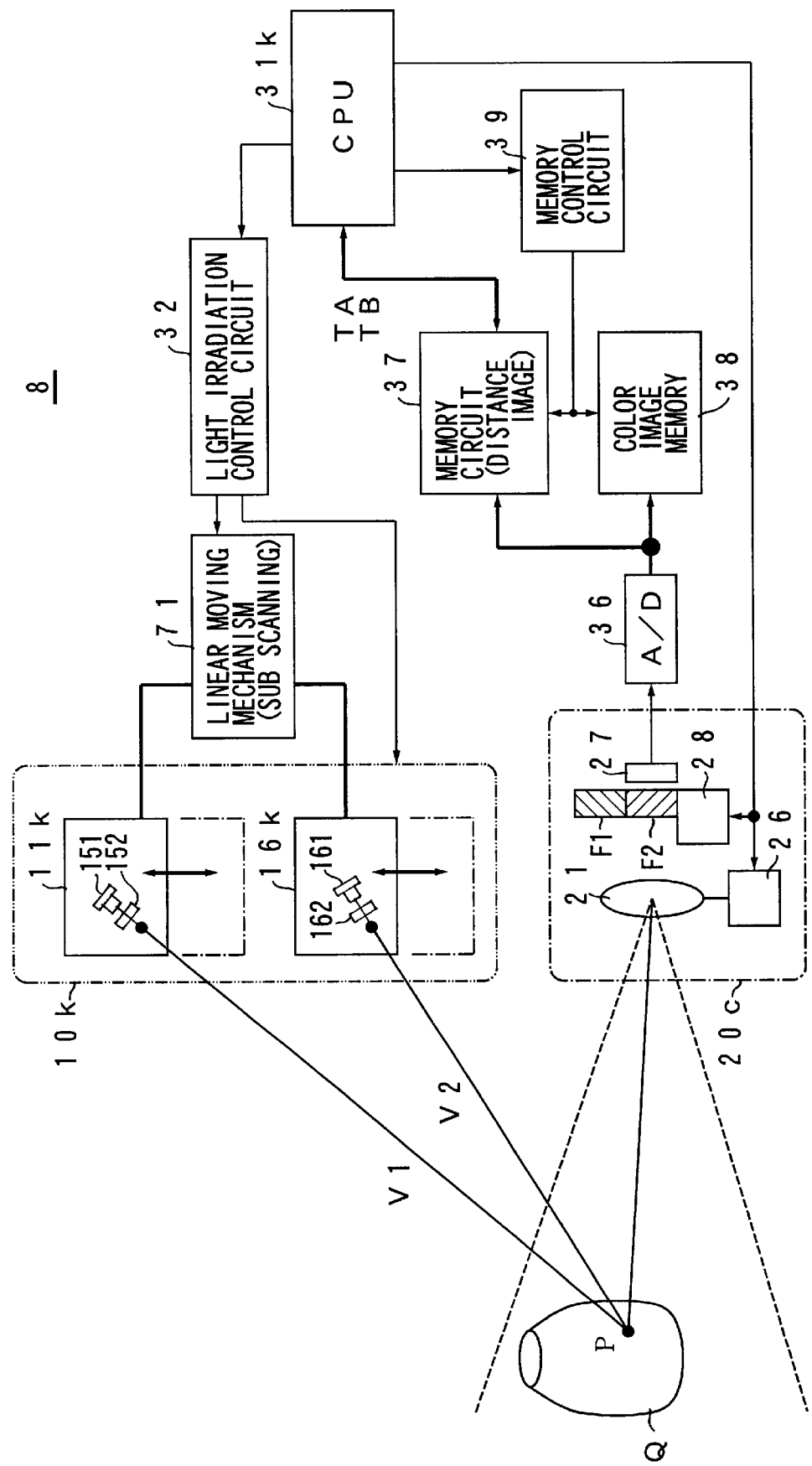
FIG. 34 is a functional block diagram of the three-dimensional data input apparatus 8 according to the eighth embodiment.

FIG. 33 is a schematic diagram of a three-dimensional data input apparatus 8 according to an eighth embodiment of the present invention. FIG. 34 is a functional block diagram of the three-dimensional data input apparatus 8 according to an eighth embodiment. In FIG. 34 and other following figures, the element denoted by the same numerals as in FIG. 28 has the same function as the above-mentioned three-dimensional data input apparatus 7.

The eighth embodiment uses not a slit light beam but a spot light beam having a spot-like section for irradiation and uses a one-dimensional image sensor (a linear sensor) for image sensing.

As shown in FIG. 33, the three-dimensional data input apparatus 8 includes an optical system 41b having an irradiation system and an image sensing system, a supporting frame 42 and an object stage 43. The optical system 41b is disposed above the object stage 43 and can move linearly in the direction M4 perpendicular to the movement direction M3 of the irradiation starting point.

As shown in FIG. 34, the irradiation system 10k of the three-dimensional data input apparatus 8 includes two light irradiation mechanisms 11k, 16k. The light irradiation mechanism 11k includes a semiconductor laser 151 and a collimator lens 152. In the same way, the light irradiation mechanism 16k includes a semiconductor laser 161 and a collimator lens 162.

The three-dimensional data input apparatus 8 uses the light irradiation mechanisms 11k for deriving a one-dimensional barycenter image indicating the time point TA of the pixel for one line, uses the light irradiation mechanism 16k for deriving a one-dimensional barycenter image indicating the time point TB of the pixel for one line, and moves the optical system 41 by a predetermined quantity d. This operation is repeated N times, so that the three-dimensional data input is performed for the outer surface of the object Q in a predetermined range. The signal processing circuit includes a memory having a capacity for memorizing data of N times. The component of the movement direction can be determined as n×d since is data of n-th scanning. Thus, the three-dimensional position data in the space of the object to be measured can be obtained.

Ninth Embodiment

Figure 35:
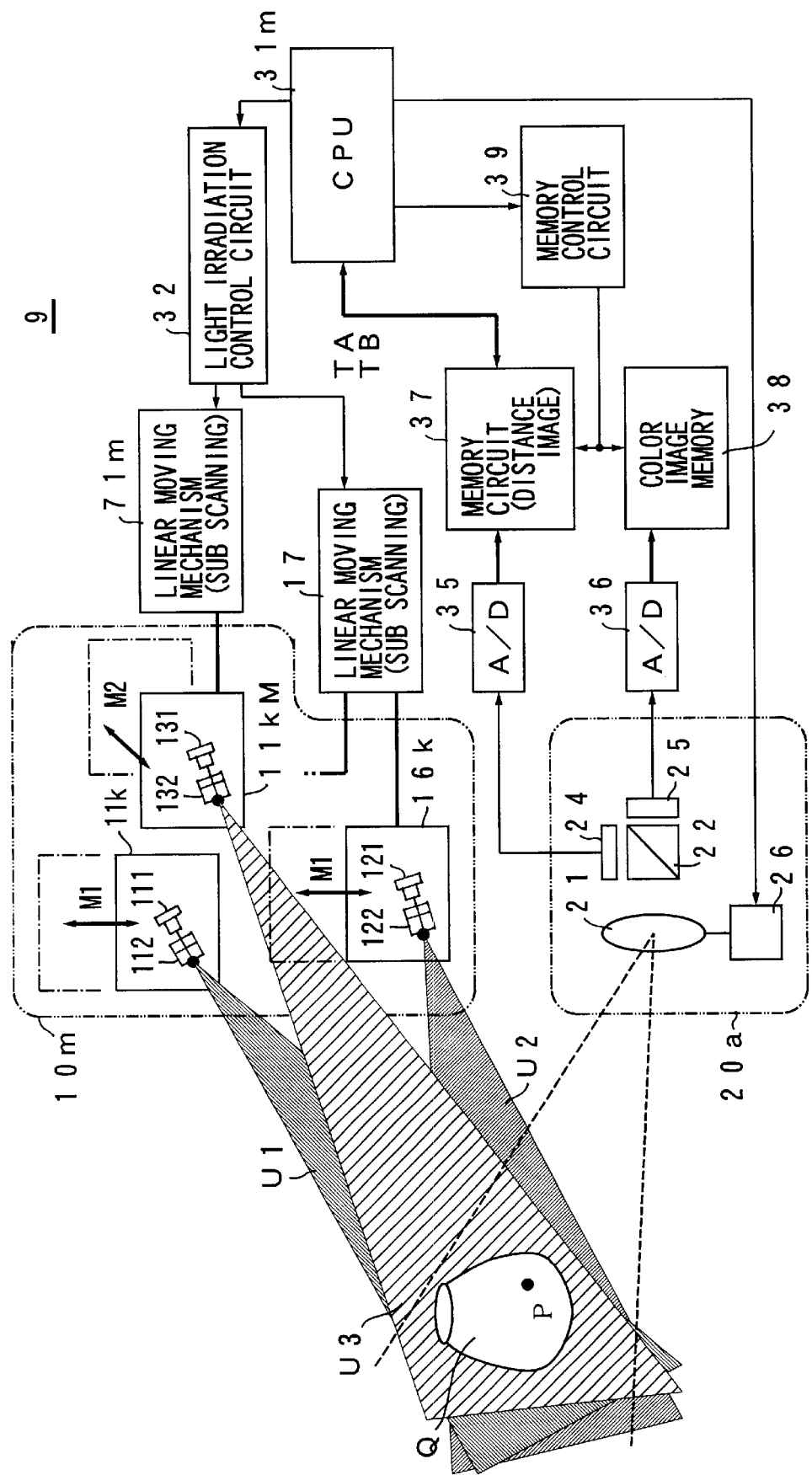
FIG. 35 is a functional block diagram of a three-dimensional data input apparatus 9 according to a ninth embodiment of the present invention.
Figure 36:
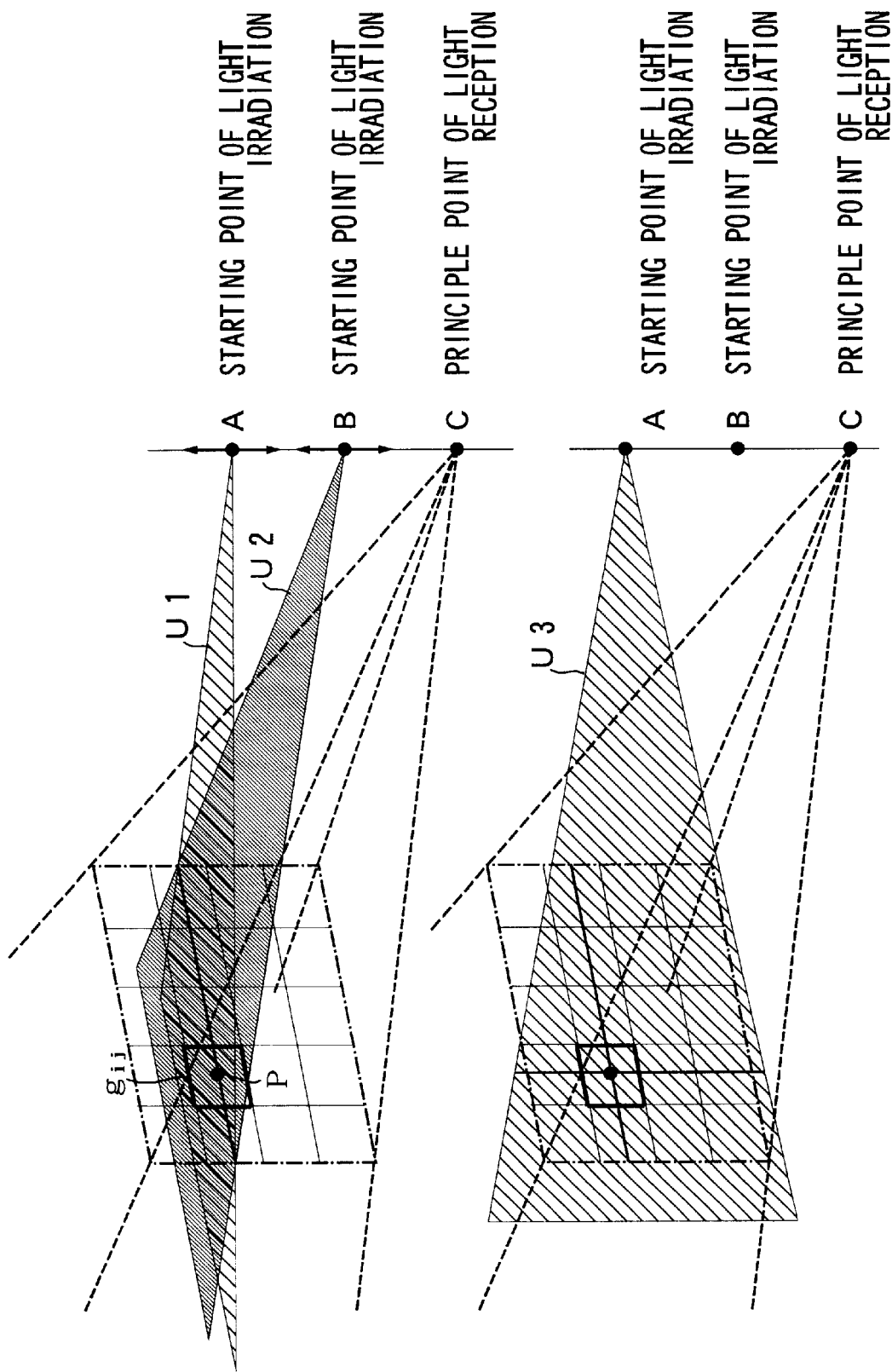
FIG. 36 is a schematic diagram of the irradiation in FIG. 35.

FIG. 35 is a functional block diagram of a three-dimensional data input apparatus 9 according to a ninth embodiment of the present invention. FIG. 36 is a schematic diagram of the irradiation in FIG. 35.

The ninth embodiment enables scanning by the slit light beam U3 in the horizontal direction, so as to specify the precise position of the point P on the object Q in the horizontal direction.

The configuration of three-dimensional data input apparatus 9 is similar to that of the three-dimensional data input apparatus 7 shown in FIG. 28 except an irradiation system 10k and the controlling portion thereof. The irradiation system 10k of the three-dimensional data input apparatus includes two light irradiation mechanisms 11k, 16k and a light irradiation mechanism 11kM for scanning in the horizontal direction. The light irradiation mechanism 11kM is moved in the direction M2 perpendicular to the movement direction M1 of the light irradiation mechanisms 11k, 16k, so that scanning in the horizontal direction can be performed. For this purpose, a linear moving mechanism 71m is provided.

The three-dimensional data input apparatus 9, after moving the slit light beams U1, U2 keeping the irradiation angle thereof to scan for detecting the time point (time barycenter) TA, TB, scanning by the slit light beam U3 in the horizontal direction is performed. The longitudinal direction of the slit light beam U3 is the vertical direction, and the irradiation angle thereof is θC. In the scanning in the horizontal direction too, the time barycenter (time point) TC when the output of each pixel $g_{ij}$ becomes the maximum is derived in the same manner as the scanning in the vertical direction. The position of point P in the horizontal direction can be calculated by applying the triangulation method in accordance with the position of the starting point in the horizontal direction that is uniquely determined by the time barycenter TC, the irradiation angle θC and the distance D derived from the positions A, B of the starting point in the vertical direction and the irradiation angles θA, θB as mentioned above.

According to the embodiments explained above, sub scanning is performed not by deflecting by a rotating mirror or other means but by moving the starting points A, B linearly. Therefore, the accuracy of position control of the scanning can be improved.

The number of the starting points is preferably two or more. The accuracy can be improved by using three starting points and increasing the combination of triangulation.

What is claimed is:

1. A method for inputting three-dimensional data, comprising the steps of:

irradiating a first reference light beam from a first starting point to an imaginary plane so as to scan the imaginary plane;

irradiating a second reference light beam from a second starting point at a distance from the first starting point to the imaginary plane so as to scan the imaginary plane;

detecting each time point when the first or the second reference light beam passes each sampling section of the imaginary plane after reflected by an object; and calculating the position of the object for each sampling section in accordance with irradiation angles of the first and the second reference light beams at each detected time point, and in accordance with a distance between the first and the second starting points.

2. The method according to claim 1, wherein each of the first and the second reference light beams has slit-like section.

3. The method according to claim 2, wherein the irradiation angle of the slit-like reference light beam is changed to scan in the longitudinal direction of the slit-like section.

4. The method according to claim 2, wherein the slit-like reference light beam scans in the longitudinal direction of the slit-like section.

5. The method according to claim 1, wherein the position of the specific part includes information of distance between a fiducial position and the specific part.

6. The method according to claim 1, wherein the position of the specific part includes information of the position in the direction perpendicular to the depth direction of the object.

7. The method according to claim 1, wherein each of the first and the second reference light beams has a spot-like section.

8. An apparatus for inputting three-dimensional data, comprising:

a light irradiation system for irradiating a first reference light beam from a first starting point to an imaginary plane so as to scan the imaginary plane, and for irradiating a second reference light beam from a second starting point at a distance from the first starting point to the imaginary plane so as to scan the imaginary plane;

an image sensing system for receiving the first and the second reference light beam after reflected by an object and converting the received light into an electrical signal; and a signal processor for detecting each time point when the first or the second reference light beam passes each sampling section of the imaginary plane after reflected by an object, in accordance with the electrical signal, wherein the apparatus outputs data corresponding to irradiation angles of the first and the second reference light beams at each time point detected by the signal processor, as position information of plural parts of the object.

9. The apparatus according to claim 8, wherein the light irradiation system includes a first optical mechanism for irradiating the first reference light beam and a second optical mechanism for irradiating the second reference light beam.

10. The apparatus according to claim 8, wherein the light irradiation system includes an optical system for irradiating the first and the second reference light beams sequentially and a moving mechanism for changing the starting point of the irradiation by moving at least a part of the optical system.

11. The apparatus according to claim 8, wherein each of the first and the second reference light beams has a slit-like section.

12. The apparatus according to claim 11, wherein the irradiation system irradiates the first and the second reference light beams to scan the imaginary plane in a first direction.

13. The apparatus according to claim 12, wherein the irradiation system irradiates the first reference light beam so as to scan the imaginary plane in the second direction perpendicular to the first direction.

14. The apparatus according to claim 8, wherein a principal light reception point of the image sensing system is located between the first starting point and the second starting point.

15. The apparatus according to claim 8, wherein a principal light reception point of the image sensing system is located at substantially equal distances form the first starting point and the second starting point.

16. The apparatus according to claim 8, wherein a principal light reception point of the image sensing system is located on the line connecting the first starting point and the second starting point.

17. The apparatus according to claim 8, wherein the position information includes information of distance between a fiducial position and a specific part.

18. The apparatus according to claim 8, wherein the position information includes information of the position in the direction perpendicular to the depth direction of the object.

19. The apparatus according to claim 8, wherein each of the first and the second reference light beams has a spot-like section.

20. An apparatus for inputting three-dimensional data comprising:
   a light irradiation system for irradiating a reference light beam from a first starting point to an object, and irradiating a reference light beam from a second starting point at a distance from the first starting point to the object so as to scan the object;
   a sensor having plural light receiving elements in a predetermined arrangement for receiving the reference light beam reflected by the object; and
   a processor for detecting each time point when the first or the second reference light beam enters in accordance with each output signal of the plural light receiving elements and for outputting position information of a predetermined part of the object in accordance with the detected time point.

21. The apparatus according to claim 20, wherein the position information is output in accordance with information of distance between the first and the second starting points.

22. The apparatus according to claim 20, wherein the position information includes information of distance between a fiducial position and a specific part.

23. The apparatus according to claim 20, wherein the position information includes information of position in the direction perpendicular to the depth direction of the object.

24. An apparatus for inputting three-dimensional data comprising:
   a light irradiation device for irradiating a reference light beam toward an imaginary plane so as to scan the imaginary plane;
   light receiving elements for receiving the reference light beam reflected by an object;
   a moving mechanism for moving the light irradiation device so as to irradiate the reference light beam from the first and the second starting point; and
   a processor for detecting each time point when the reference light beam passes each sampling section of the imaginary plane in accordance with the light receiving result, and for calculating the position information of the specific part of the object in accordance with irradiation angles of the reference light beams irradiated from the first and the second starting point at each detected time point.

25. The apparatus according to claim 24, wherein the position information includes information of distance between a fiducial position and a specific part.

26. The apparatus according to claim 24, wherein the position information includes information of the position in the direction perpendicular to the depth direction of the object.

27. The apparatus according to claim 24, wherein the position information is calculated from the two light irradiation angles and information of distance between the first and the second starting points.

28. A method for inputting three-dimensional data, comprising the steps of:
   irradiating a reference light beam toward an imaginary plane so as to scan the imaginary plane;
   receiving the reference light beam reflected by an object, at first and second receiving positions apart from each other simultaneously;
   detecting each time point when the reference light beam passes each sampling section of the imaginary plane after reflected by an object; and
   calculating the position of the object for each sampling section in accordance with light reception angles of the reference light beam of the first and the second receiving positions at each detected time point, and in accordance with a distance between the first and the second receiving positions.

29. The method according to claim 28, wherein the reference light beam is irradiated from a starting point located between the first and the second receiving positions.

30. The method according to claim 29, wherein the reference light beam is irradiated from a starting point located at equal distances from the first and the second receiving positions.

31. The method according to claim 28, wherein the reference light beam is irradiated from a starting point located on the line connecting the first and the second receiving positions.

32. The method according to claim 28, wherein the light reception angle of the reference light beam is calculated from the time point when the light reception output corresponding to each sampling section becomes the maximum.

33. The method according to claim 28, wherein the reference light beam having a slit-like section is irradiated.

34. The method according to claim 28, wherein the reference light beam having a spot-like section is irradiated.

35. An apparatus for inputting three-dimensional data comprising:
   a light irradiation system for irradiating a reference light beam toward an imaginary plane so as to scan the imaginary plane;
   an image sensing system for receiving the reference light beam reflected by an object at a first and second receiving position apart from each other simultaneously and converting the received light into an electrical signal; and
   a signal processor for detecting each time point when the reference light beam reflected by the object passes each sampling section of the imaginary plane, in accordance with the electrical signal corresponding to each receiving position, wherein the apparatus outputs data corresponding to the light reception angle of the reference light beam of the first and the second receiving positions at each time point detected by the signal processor, as position information of plural parts of the object.

36. The apparatus according to claim 35, wherein a starting point for irradiating the reference light beam is located between the first and the second receiving positions.

37. The apparatus according to claim 36, wherein the starting point for irradiating the reference light beam is located at equal distances from the first and the second receiving positions.

38. The apparatus according to claim 35, wherein a starting point for irradiating the reference light beam is located on the line connecting the first and the second receiving positions.

39. The apparatus according to claim 35, wherein the light reception angle of the reference light beam is calculated from the time point when the light reception output corresponding to each sampling section becomes the maximum.

40. The apparatus according to claim 35, wherein the irradiation system irradiates the reference light beam having a slit-like section.

41. The apparatus according to claim 35, wherein the irradiation system irradiates the reference light beam having a spot-like section.

42. An apparatus for inputting three-dimensional data comprising:
- a light irradiation device for irradiating a reference light beam toward an object so as to scan the object;
- a first sensor having plural light receiving elements in a predetermined arrangement for receiving the reference light beam reflected by the object;
- a second sensor having plural light receiving elements in a predetermined arrangement, located at a predetermined distance from the first sensor, for receiving the reference light beam reflected by the object; and
- a processor for detecting the time point when the reference light beam is determined to enter each sensor in accordance with each output signal of the plural light receiving elements, so as to output position information of a predetermined part of the object in accordance with irradiation angles of the reference light beams irradiated from the detected time point.

43. The apparatus according to claim 42, wherein the position information is output in accordance with information of distance between the first and the second sensors.

44. The apparatus according to claim 42, wherein the position information includes information of distance between a fiducial position and a specific part.

45. The apparatus according to claim 42, wherein the position information includes information of the position in the direction perpendicular to the depth direction of the object.

46. A method for inputting three-dimensional data by irradiating a reference light beam toward an object so as to scan an imaginary plane, the method comprising the steps of:
- irradiating a reference light beam toward the object from a first starting point by a first angle;
- irradiating a reference light beam toward the object from a second starting point apart from the first starting point by a second angle;
- moving the first and the second starting point in one direction so as to scan the imaginary plane;
- detecting each time point when the reference light beam reflected by the object passes each sampling section of the imaginary plane for each of the first and the second starting point; and
- calculating the position of the object for each sampling section in accordance with positions of the first and the second starting point and in accordance with the first and the second angles at each detected time point.

47. The method according to claim 46, wherein the first and the second angles are fixed in the sequential scanning.

48. The method according to claim 46, wherein the irradiation of the reference light beam is performed by a slit-like light beam.

49. The method according to claim 48, wherein the movement of the first and the second starting points is performed in the direction perpendicular to the longitudinal direction of the slit-like light beam.

50. The method according to claim 48, wherein a slit-like reference light beam is irradiated to scan in the longitudinal direction of the slit.

51. An apparatus for inputting three-dimensional data by irradiating a reference light beam toward an object so as to scan an imaginary plane and determining positions of plural parts of the object, the apparatus comprising:
- a light irradiation system for irradiating the reference light beam from a first starting point to the object by a first angle, and for irradiating the reference light beam from a second starting point apart from the first starting point to the object by a second angle;
- a scanning mechanism for moving the first and the second starting points in one direction;
- an image sensing system for receiving the reference light beam reflected by the object and converting the received light into an electrical signal; and
- a signal processor for detecting each time point when the reference light beam reflected by the object passes each sampling section of the imaginary plane for each of the first and the second starting point, in accordance with the electrical signal, wherein the apparatus outputs data corresponding to each of the first and the second positions at each time point detected by the signal processor, as the three-dimensional data.

52. The apparatus according to claim 51, wherein the first and the second angles are fixed in the sequential scanning.

53. The apparatus according to claim 51, wherein the irradiation system includes plural light sources for irradiating reference light beams-from the first and the second starting points.

54. The apparatus according to claim 51, wherein the irradiation system includes a light source for irradiating the reference light beam and an optical member for changing the light irradiation angle of the reference light beam.

55. The apparatus according to claim 51, wherein the first angle is an acute angle, while the second angle is an obtuse angle.

56. The apparatus according to claim 51, wherein the sum of the first and the second angles is 180 degrees.

57. The apparatus according to claim 51, wherein the first angle is 90 degrees.

58. The apparatus according to claim 51, wherein the reference light beam has a slit-like section.

59. The apparatus according to claim 58, wherein the irradiation system irradiates the reference light beam so as to scan the imaginary plane in a first direction, and irradiates the reference light beam so as to scan the imaginary plane in a second direction perpendicular to the first direction.

60. The apparatus according to claim 58, wherein the movement direction by the scanning mechanism is the direction perpendicular to the longitudinal direction of the slit-like section of the reference light beam.

* * * * *